United States Patent
Honeyman et al.

(10) Patent No.: US 7,411,720 B2
(45) Date of Patent: Aug. 12, 2008

(54) ELECTROPHORETIC PARTICLES AND PROCESSES FOR THE PRODUCTION THEREOF

(75) Inventors: Charles Howie Honeyman, Roslindale, MA (US); Elizabeth Moran Gates, Somerville, MA (US); Libing Zhang, Sharon, MA (US); Anthony Edward Pullen, Belmont, MA (US); Emily J. Pratt, Portsmouth, NH (US); Kimberly L. Houde, Bethesda, MD (US); Matthew A. King, Marina del Rey, CA (US); Craig A. Herb, Medford, MA (US); Richard J. Paolini, Jr., Framingham, MA (US)

(73) Assignee: E Ink Corporation, Cambridge, MA (US)

( * ) Notice: Subject to any disclaimer, the term of this patent is extended or adjusted under 35 U.S.C. 154(b) by 0 days.

(21) Appl. No.: 11/673,269

(22) Filed: Feb. 9, 2007

(65) Prior Publication Data

US 2007/0128352 A1 Jun. 7, 2007

Related U.S. Application Data

(62) Division of application No. 10/711,278, filed on Sep. 7, 2004, now abandoned, which is a division of application No. 10/063,803, filed on May 15, 2002, now Pat. No. 6,822,782.

(60) Provisional application No. 60/291,081, filed on May 15, 2001.

(51) Int. Cl.
*G02B 26/00* (2006.01)
*G09G 3/34* (2006.01)

(52) U.S. Cl. ....................... 359/296; 345/107

(58) Field of Classification Search ............ 359/296
See application file for complete search history.

(56) References Cited

U.S. PATENT DOCUMENTS 2,800,457 A 7/1957 Green et al.

(Continued)

FOREIGN PATENT DOCUMENTS

GB 1465701 3/1977

(Continued)

OTHER PUBLICATIONS

Amundson, K., et al., "Flexible, Active-Matrix Display Constructed Using a Microencapsulated Electrophoretic Material and an Organic-Semiconductor-Based Backplane", SID 01 Digest, 160 (Jun. 2001).

(Continued)

*Primary Examiner*—Jordan M. Schwartz
*Assistant Examiner*—James C Jones
(74) *Attorney, Agent, or Firm*—David J. Cole

(57) ABSTRACT

In electrophoretic media, it is advantageous to use pigment particles having about 1 to 15 per cent by weight of a polymer chemically bonded to, or cross-linked around, the pigment particles. The polymer desirably has a branched chain structure with side chains extending from a main chain. Charged or chargeable groups can be incorporated into the polymer or can be bonded to the particles separately from the polymer. The polymer-coated particles can be prepared by first attaching a polymerizable or polymerization-initiating group to the particle and then reacting the particle with one or more polymerizable monomers or oligomers.

10 Claims, 8 Drawing Sheets

U.S. PATENT DOCUMENTS

| | | |
|---|---|---|
| 3,639,133 A | 2/1972 | Linton |
| 3,668,106 A | 6/1972 | Ota |
| 3,756,693 A | 9/1973 | Ota |
| 3,767,392 A | 10/1973 | Ota |
| 3,792,308 A | 2/1974 | Ota |
| 3,870,517 A | 3/1975 | Ota et al. |
| 3,884,871 A * | 5/1975 | Herman et al. ............... 523/202 |
| 3,892,568 A | 7/1975 | Ota |
| 4,001,140 A | 1/1977 | Foris et al. |
| 4,093,534 A | 6/1978 | Carter et al. |
| 4,113,362 A | 9/1978 | Saxe et al. |
| 4,164,365 A | 8/1979 | Saxe |
| 4,273,422 A | 6/1981 | Saxe |
| 4,273,672 A | 6/1981 | Vassiliades |
| 4,285,801 A | 8/1981 | Chiang |
| 4,298,448 A | 11/1981 | Muller et al. |
| 4,314,013 A | 2/1982 | Chang |
| 4,418,346 A | 11/1983 | Batchelder |
| 4,476,210 A | 10/1984 | Croucher et al. |
| 4,530,961 A | 7/1985 | Nguyen et al. |
| 4,594,271 A | 6/1986 | Scholten et al. |
| 4,639,403 A | 1/1987 | Podszun et al. |
| 4,661,408 A | 4/1987 | Lau et al. |
| 4,665,107 A | 5/1987 | Micale |
| 4,680,103 A | 7/1987 | Beilin et al. |
| 4,690,749 A | 9/1987 | Van Alstine et al. |
| 4,772,103 A | 9/1988 | Saxe |
| 4,810,305 A | 3/1989 | Braun et al. |
| 4,846,893 A | 7/1989 | Akasaki et al. |
| 4,877,698 A | 10/1989 | Watson et al. |
| 4,888,309 A | 12/1989 | Araya |
| 4,891,245 A | 1/1990 | Micale |
| 4,892,607 A | 1/1990 | DiSanto et al. |
| 4,902,570 A | 2/1990 | Heinemann et al. |
| 4,946,509 A | 8/1990 | Schwartz et al. |
| 4,985,329 A | 1/1991 | El-Sayed et al. |
| 5,066,559 A | 11/1991 | Elmasry et al. |
| 5,279,773 A | 1/1994 | Saxe |
| 5,281,261 A | 1/1994 | Lin |
| 5,298,833 A | 3/1994 | Hou |
| 5,360,689 A | 11/1994 | Hou et al. |
| 5,380,362 A | 1/1995 | Schubert |
| 5,403,518 A | 4/1995 | Schubert |
| 5,411,656 A | 5/1995 | Schubert |
| 5,467,217 A | 11/1995 | Check, III et al. |
| 5,498,674 A | 3/1996 | Hou et al. |
| 5,543,219 A | 8/1996 | Elwakil |
| 5,545,504 A | 8/1996 | Keoshkerian et al. |
| 5,554,739 A | 9/1996 | Belmont |
| 5,571,311 A | 11/1996 | Belmont et al. |
| 5,573,711 A | 11/1996 | Hou et al. |
| 5,575,845 A | 11/1996 | Belmont et al. |
| 5,604,070 A | 2/1997 | Rao et al. |
| 5,627,561 A | 5/1997 | Laspina et al. |
| 5,643,673 A | 7/1997 | Hou |
| 5,672,198 A | 9/1997 | Belmont |
| 5,698,016 A | 12/1997 | Adams et al. |
| 5,707,432 A | 1/1998 | Adams et al. |
| 5,707,738 A | 1/1998 | Hou |
| 5,713,988 A | 2/1998 | Belmont et al. |
| 5,714,993 A | 2/1998 | Keoshkerian et al. |
| 5,745,094 A | 4/1998 | Gordon, II et al. |
| 5,747,562 A | 5/1998 | Mahmud et al. |
| 5,750,258 A * | 5/1998 | Sakai et al. ................. 428/405 |
| 5,753,763 A | 5/1998 | Rao et al. |
| 5,760,761 A | 6/1998 | Sheridon |
| 5,763,548 A | 6/1998 | Matyjaszewski et al. |
| 5,777,782 A | 7/1998 | Sheridon |
| 5,783,614 A | 7/1998 | Chen et al. |
| 5,789,487 A | 8/1998 | Matyjaszewski et al. |
| 5,803,959 A | 9/1998 | Johnson et al. |
| 5,807,937 A | 9/1998 | Matyjaszewski et al. |
| 5,808,783 A | 9/1998 | Crowley |
| 5,837,045 A | 11/1998 | Johnson et al. |
| 5,851,280 A | 12/1998 | Belmont et al. |
| 5,872,552 A | 2/1999 | Gordon, II et al. |
| 5,885,335 A | 3/1999 | Adams et al. |
| 5,895,522 A | 4/1999 | Belmont et al. |
| 5,914,806 A | 6/1999 | Gordon II et al. |
| 5,922,118 A | 7/1999 | Johnson et al. |
| 5,930,026 A | 7/1999 | Jacobson et al. |
| 5,932,633 A | 8/1999 | Chen et al. |
| 5,945,491 A | 8/1999 | Matyjaszewski et al. |
| 5,958,999 A | 9/1999 | Bates et al. |
| 5,961,804 A | 10/1999 | Jacobson et al. |
| 5,964,935 A | 10/1999 | Chen et al. |
| 5,968,243 A | 10/1999 | Belmont et al. |
| 5,986,015 A | 11/1999 | Midha et al. |
| H1828 H | 1/2000 | Wong et al. |
| 6,017,584 A | 1/2000 | Albert et al. |
| 6,025,896 A | 2/2000 | Hattori et al. |
| 6,054,071 A | 4/2000 | Mikkelsen, Jr. |
| 6,055,091 A | 4/2000 | Sheridon et al. |
| 6,064,784 A | 5/2000 | Whitehead et al. |
| 6,067,185 A | 5/2000 | Albert et al. |
| 6,068,688 A | 5/2000 | Whitehouse et al. |
| 6,069,205 A | 5/2000 | Wang |
| 6,071,980 A | 6/2000 | Guan et al. |
| 6,097,531 A | 8/2000 | Sheridon |
| 6,103,380 A * | 8/2000 | Devonport ................. 428/403 |
| 6,111,022 A | 8/2000 | Matyjaszewski et al. |
| 6,113,810 A | 9/2000 | Hou et al. |
| 6,117,368 A | 9/2000 | Hou |
| 6,118,426 A | 9/2000 | Albert et al. |
| 6,120,588 A | 9/2000 | Jacobson |
| 6,120,839 A | 9/2000 | Comiskey et al. |
| 6,121,371 A | 9/2000 | Matyjaszewski et al. |
| 6,124,411 A | 9/2000 | Matyjaszewski et al. |
| 6,124,851 A | 9/2000 | Jacobson |
| 6,128,124 A | 10/2000 | Silverman |
| 6,130,773 A | 10/2000 | Jacobson et al. |
| 6,130,774 A | 10/2000 | Albert et al. |
| 6,137,012 A | 10/2000 | Fagan et al. |
| 6,137,467 A | 10/2000 | Sheridon et al. |
| 6,144,361 A | 11/2000 | Gordon, II et al. |
| 6,147,791 A | 11/2000 | Sheridon |
| 6,153,705 A | 11/2000 | Corpart et al. |
| 6,162,882 A | 12/2000 | Matyjaszewski et al. |
| 6,172,798 B1 | 1/2001 | Albert et al. |
| 6,177,921 B1 | 1/2001 | Comiskey et al. |
| 6,184,856 B1 | 2/2001 | Gordon, II et al. |
| 6,191,225 B1 | 2/2001 | Barkac et al. |
| 6,197,883 B1 | 3/2001 | Schimmel et al. |
| 6,215,920 B1 | 4/2001 | Whitehead et al. |
| 6,221,143 B1 | 4/2001 | Palumbo |
| 6,225,971 B1 | 5/2001 | Gordon, II et al. |
| 6,232,950 B1 | 5/2001 | Albert et al. |
| 6,235,829 B1 | 5/2001 | Kwan |
| 6,241,921 B1 | 6/2001 | Jacobson et al. |
| 6,249,271 B1 | 6/2001 | Albert et al. |
| 6,252,564 B1 | 6/2001 | Albert et al. |
| 6,262,706 B1 | 7/2001 | Albert et al. |
| 6,262,833 B1 | 7/2001 | Loxley et al. |
| 6,271,823 B1 | 8/2001 | Gordon, II et al. |
| 6,300,932 B1 | 10/2001 | Albert |
| 6,301,038 B1 | 10/2001 | Fitzmaurice et al. |
| 6,312,304 B1 | 11/2001 | Duthaler et al. |
| 6,312,971 B1 | 11/2001 | Amundson et al. |
| 6,323,989 B1 | 11/2001 | Jacobson et al. |
| 6,327,072 B1 | 12/2001 | Comiskey et al. |
| 6,376,828 B1 | 4/2002 | Comiskey |
| 6,377,387 B1 | 4/2002 | Duthaler et al. |
| 6,392,785 B1 | 5/2002 | Albert et al. |
| 6,392,786 B1 | 5/2002 | Albert |

| | | |
|---|---|---|
| 6,398,858 B1 | 6/2002 | Yu et al. |
| 6,413,790 B1 | 7/2002 | Duthaler et al. |
| 6,422,687 B1 | 7/2002 | Jacobson |
| 6,445,374 B2 | 9/2002 | Albert et al. |
| 6,445,489 B1 | 9/2002 | Jacobson et al. |
| 6,459,418 B1 | 10/2002 | Comiskey et al. |
| 6,473,072 B1 | 10/2002 | Comiskey et al. |
| 6,480,182 B2 | 11/2002 | Turner et al. |
| 6,498,114 B1 | 12/2002 | Amundson et al. |
| 6,504,524 B1 | 1/2003 | Gates et al. |
| 6,506,438 B2 | 1/2003 | Duthaler et al. |
| 6,512,354 B2 | 1/2003 | Jacobson et al. |
| 6,515,649 B1 | 2/2003 | Albert et al. |
| 6,518,949 B2 | 2/2003 | Drzaic |
| 6,521,489 B2 | 2/2003 | Duthaler et al. |
| 6,531,997 B1 | 3/2003 | Gates et al. |
| 6,535,197 B1 | 3/2003 | Comiskey et al. |
| 6,538,801 B2 | 3/2003 | Jacobson et al. |
| 6,545,291 B1 | 4/2003 | Amundson et al. |
| 6,580,545 B2 | 6/2003 | Morrison et al. |
| 6,639,578 B1 | 10/2003 | Comiskey et al. |
| 6,657,772 B2 | 12/2003 | Loxley |
| 6,664,944 B1 | 12/2003 | Albert et al. |
| 6,672,921 B1 | 1/2004 | Liang et al. |
| 6,680,725 B1 | 1/2004 | Jacobson |
| 6,683,333 B2 | 1/2004 | Kazlas et al. |
| 6,693,620 B1 | 2/2004 | Herb et al. |
| 6,710,540 B1 | 3/2004 | Albert et al. |
| 6,724,519 B1 | 4/2004 | Morrison et al. |
| 6,727,881 B1 | 4/2004 | Albert et al. |
| 6,788,449 B2 | 9/2004 | Liang et al. |
| 6,816,147 B2 | 11/2004 | Albert |
| 6,825,068 B2 | 11/2004 | Denis et al. |
| 6,825,829 B1 | 11/2004 | Albert et al. |
| 6,839,158 B2 | 1/2005 | Albert et al. |
| 6,842,657 B1 | 1/2005 | Drzaic et al. |
| 6,864,875 B2 | 3/2005 | Drzaic et al. |
| 6,866,760 B2 | 3/2005 | Paolini Jr. et al. |
| 6,870,661 B2 | 3/2005 | Pullen et al. |
| 2002/0060321 A1 | 5/2002 | Kazlas et al. |
| 2002/0063661 A1 | 5/2002 | Comiskey et al. |
| 2002/0090980 A1 | 7/2002 | Wilcox et al. |
| 2002/0113770 A1 | 8/2002 | Jacobson et al. |
| 2002/0130832 A1 | 9/2002 | Baucom et al. |
| 2002/0180687 A1 | 12/2002 | Webber |
| 2003/0011560 A1 | 1/2003 | Albert et al. |
| 2003/0020844 A1 | 1/2003 | Albert et al. |
| 2003/0151702 A1 | 8/2003 | Morrison et al. |
| 2004/0119681 A1 | 6/2004 | Albert et al. |
| 2005/0035941 A1 | 2/2005 | Albert et al. |

FOREIGN PATENT DOCUMENTS

| | | |
|---|---|---|
| JP | 51-130241 A | 11/1976 |
| JP | 55-105227 A | 8/1980 |
| JP | 59-165028 A | 9/1984 |
| JP | 60-189731 A | 9/1985 |
| JP | 62-183439 A | 8/1987 |
| JP | 63-008637 A | 1/1988 |
| JP | 01-114829 A | 5/1989 |
| JP | 01-248182 A | 10/1989 |
| JP | 02-024633 A | 1/1990 |
| JP | 02-141730 A | 5/1990 |
| JP | 02-189525 A | 7/1990 |
| JP | 03-258866 A | 11/1991 |
| JP | 05-173193 A | 7/1993 |
| JP | 07-146660 A | 6/1995 |
| JP | 2000-066248 | 3/2000 |
| JP | 2000-227612 | 8/2000 |
| WO | WO 95/33085 | 12/1995 |
| WO | WO 99/51690 | 10/1999 |
| WO | WO 00/05312 | 2/2000 |
| WO | WO 00/05704 | 2/2000 |
| WO | WO 00/22051 | 4/2000 |
| WO | WO 00/36560 | 6/2000 |
| WO | WO 00/38000 | 6/2000 |
| WO | WO 00/67110 | 11/2000 |
| WO | WO 00/67327 | 11/2000 |
| WO | WO 01/07961 | 2/2001 |
| WO | WO 01/27690 | 4/2001 |
| WO | WO 01/92359 | 12/2001 |
| WO | WO 02/21201 | 3/2002 |

OTHER PUBLICATIONS

Bach, U., et al., "Nanomaterials-Based Electrochromics for Paper-Quality Displays", Adv. Mater, 14(11), 845 (2002).

Beers, K. L., et al., "Atom Transfer Radical Polymerization of 2-Hydroxyethyl Methacrylate", Macromolecules, 32, 5772-5776 (1999).

Chen, Y., et al., "A Conformable Electronic Ink Display using a Foil-Based-a-Si TFT Array", SID 01 Digest, 157 (Jun. 2001).

Chiang, A., "Conduction Mechanism of Charge Control Agents Used in Electrophoretic Display Devices", Proceeding of the S.I.D., 18, 275 (1977).

Comiskey, B., et al., "An electrophoretic ink for all-printed reflective electronic displays", Nature, 394, 253 (1998).

Comiskey, B., et al., "Electrophoretic Ink: A Printable Display Material", SID 97 Digest (1997), p. 75.

Croucher, M.D., et al., "Electrophoretic Display: Materials as Related to Performance", Photog. Sci. Eng., 25, 80 (1981).

Drzaic, P., et al., "A Printed and Rollable Bistable Electronic Display", SID 98 Digest (1998), p. 1131.

Fitzhenry, B., "Identification of a Charging Mechanism using Infrared Spectroscopy", Appl. Spectroscopy, 33, 107 (1979).

Gutcho, M.H., Microcapsules and MIcroencapsulation Techniques, Noyes Data Corp., Park Ridge NJ, (1976).

Hou, J., et al., "Active Matrix Electrophoretic Displays Containing Black and White Particles with Opposite Polarities", SID 01 Digest, 164 (Jun. 2001).

Jacobson, J., et al., "The last book", IBM Systems J., 36, 457 (1997).

Jo, G-R, et al., "Toner Display Based on Particle Movements", Chem. Mater, 14, 664 (2002).

Kazlas, P., et al., "12.1" SVGA Microencapsulated Electrophoretic Active Matrix Display for Information Applicances, SID 01 Digest, 152 (Jun. 2001).

Kitamura, T., et al., "Electrical toner movement for electronic paper-like display", Asia Display/IDW '01, p. 1517, Paper HCS1-1 (2001).

Lewis et al., "Gravitational, Inter-Particle and Particle-Electrode Forces in the Electrophoretic Display", Proceedings of the SID, 18, 235 (1977).

Milner, "Polymer Brushes", Science, 251, 905 (1991).

Murau, P., et al., "The understanding and elimination of some suspension instabilities in an electrophoretic display", J. Appl. Phys., 49, 4820 (1978).

O'Regan, B. et al., "A Low Cost, High-efficiency Solar Cell Based on Dye-sensitized colloidal TiO2 Films", Nature, vol. 353, Oct. 24, 1991, 773-740.

Ota, I., et al., "Developments in Electrophoretic Displays", Proceedings of the SID, 18, 243 (1977).

Ota, I., et al., "Electrophoretic display devices", Laser 75 Optoelectronics Conference Proceedings, 145 (1975).

Ota, I., et al., "Electrophoretic Image Display (EPID) Panel", Proceedings of the IEEE, 61, 832 (1973).

Tsubokawa, N., et al., "Polymerization of vinyl monomers in the presence of silica having surface functional groups", Colloid. Polym. Sci., 271, 940 (1993).

Vandegaer, J.E. (ed.), "Microencapsulation Processes and Applications", pp. v-x, 1-180 (Plenum Press, New York 1974).

Wang, J.S. et al., "Controlled/'Living' Radical Polymerization. Atom Transfer Radical Polymerization in the Presence of Transition-Metal Complexes", J. Am. Chem. Soc., 117, 5614 (1995).

Wang, J-S, et al., "Controlled/'Living' Radical Polymerization. Halogen Atom Transfer Radical Polymerization Promoted by a Cu(I)/CU(II) Redox Process", Macromolecules 1995, 28, 7901-7910.

Wood, D., "An electrochromic Renaissance?" Information Display, 18(3), 24 (Mar. 2002).

Yamaguchi, Y., et al., "Toner display using insulative particles charged triboelectrically", Asia Display/IDW '01, p. 1729, Paper AMD4-4 (2001).

* cited by examiner

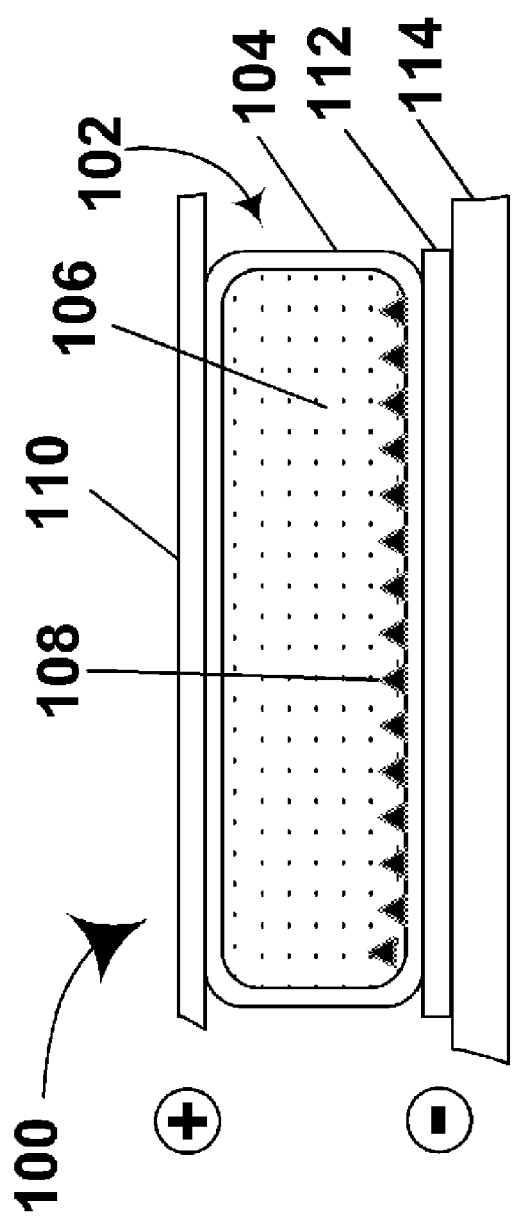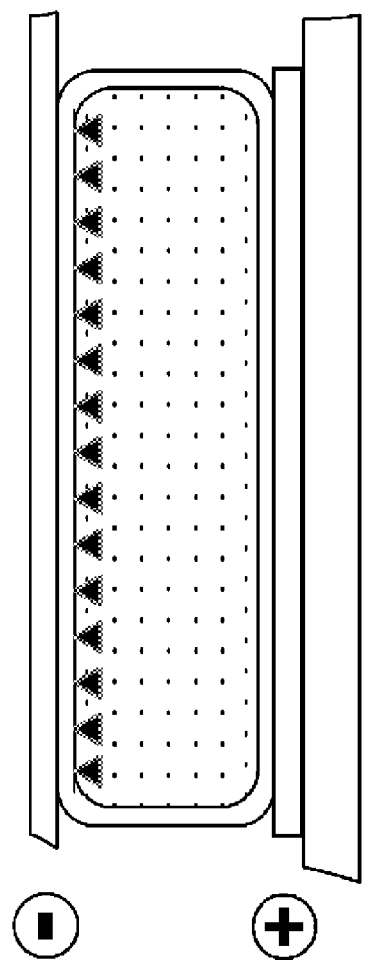

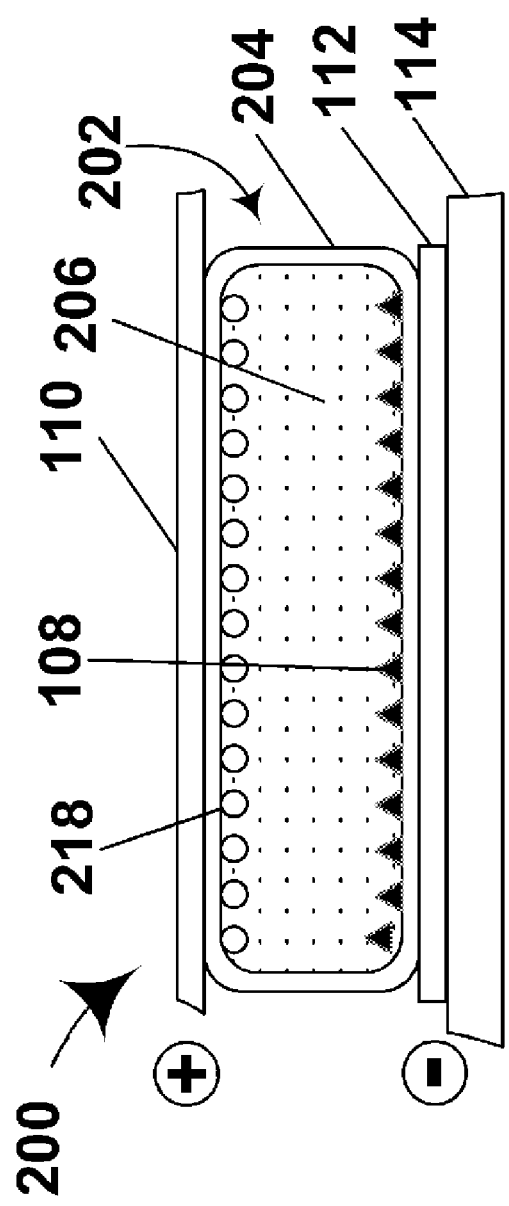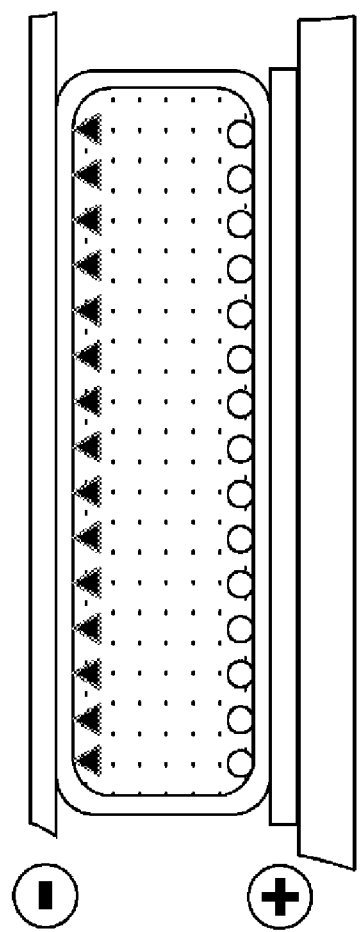

ELECTROPHORETIC PARTICLES AND PROCESSES FOR THE PRODUCTION THEREOF

REFERENCE TO RELATED APPLICATIONS

This application is a divisional of application Ser. No. 10/711,278, filed Sep. 7, 2004 now abandoned (Publication No. 2005/0018273), which is itself a divisional of application Ser. No. 10/063,803, filed May 15, 2002 (now U.S. Pat. No. 6,822,782, issued Nov. 23, 2004), which itself claims priority from Provisional Application Ser. No. 60/291,081 filed May 15, 2001. The entire disclosure of these earlier applications are herein incorporated by reference.

BACKGROUND OF INVENTION

This invention relates to electrophoretic particles (i.e., particles for use in an electrophoretic medium) and processes for the production of such electrophoretic particles. This invention also relates to electrophoretic media and displays incorporating such particles. More specifically, this invention relates to electrophoretic particles the surfaces of which are modified with polymers.

Electrophoretic displays have been the subject of intense research and development for a number of years. Such displays can have attributes of good brightness and contrast, wide viewing angles, state bistability, and low power consumption when compared with liquid crystal displays. (The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element.) Nevertheless, problems with the long-term image quality of these displays have prevented their widespread usage. For example, particles that make up electrophoretic displays tend to settle, resulting in inadequate service-life for these displays.

Numerous patents and applications assigned to or in the names of the Massachusetts Institute of Technology and E Ink Corporation have recently been published describing encapsulated electrophoretic media. Such encapsulated media comprise numerous small capsules, each of which itself comprises an internal phase containing electrophoretically mobile particles suspended in a liquid suspension medium, and a capsule wall surrounding the internal phase. Typically, the capsules are themselves held within a polymeric binder to form a coherent layer positioned between two electrodes. Encapsulated media of this type are described, for example, in U.S. Pat. Nos. 5,930,026; 5,961,804; 6,017,584; 6,067,185; 6,118,426; 6,120,588; 6,120,839; 6,124,851; 6,130,773; 6,130,774; 6,172,798; 6,177,921; 6,232,950; 6,241,921; 6,249,271; 6,252,564; 6,262,706; 6,262,833; 6,300,932; 6,312,304; 6,312,971; 6,323,989; 6,327,072; 6,376,828; and 6,377,387; U.S. Patent Application Publication Nos. 2001-0045934; 2002-0018042; 2002-0019081; and 2002-0021270; and International Applications Publication Nos. WO 97/04398; WO 98/03896; WO 98/19208; WO 98/41898; WO 98/41899; WO 99/10767; WO 99/10768; WO 99/10769; WO 99/47970; WO 99/53371; WO 99/53373; WO 99/56171; WO 99/59101; WO 99/67678; WO 00/03349; WO 00/03291; WO 00/05704; WO 00/20921; WO 00/20922; WO 00/20923; WO 00/26761; WO 00/36465; WO 00/36560; WO 00/36666; WO 00/38000; WO 00/38001; WO 00/59625; WO 00/60410; WO 00/67110; WO 00/67327 WO 01/02899; WO 01/07691; WO 01/08241; WO 01/08242; WO 01/17029; WO 01/17040; WO 01/17041; WO 01/80287 and WO 02/07216. The entire disclosures of all these patents and published applications are herein incorporated by reference.

Known electrophoretic media, both encapsulated and unencapsulated, can be divided into two main types, referred to hereinafter for convenience as "single particle" and "dual particle" respectively. A single particle medium has only a single type of electrophoretic particle suspending in a colored suspending medium, at least one optical characteristic of which differs from that of the particles. (In referring to a single type of particle, we do not imply that all particles of the type are absolutely identical. For example, provided that all particles of the type possess substantially the same optical characteristic and a charge of the same polarity, considerable variation in parameters such as particle size and electrophoretic mobility can be tolerated without affecting the utility of the medium.) The optical characteristic is typically color visible to the human eye, but may, alternatively or in addition, be any one of more of reflectivity, retroreflectivity, luminescence, fluorescence, phosphorescence, or color in the broader sense of meaning a difference in absorption or reflectance at non-visible wavelengths. When such a medium is placed between a pair of electrodes, at least one of which is transparent, depending upon the relative potentials of the two electrodes, the medium can display the optical characteristic of the particles (when the particles are adjacent the electrode closer to the observer, hereinafter called the "front" electrode) or the optical characteristic of the suspending medium (when the particles are adjacent the electrode remote from the observer, hereinafter called the "rear" electrode, so that the particles are hidden by the colored suspending medium).

A dual particle medium has two different types of particles differing in at least one optical characteristic and a suspending fluid which may be uncolored or colored, but which is typically uncolored. The two types of particles differ in electrophoretic mobility; this difference in mobility may be in polarity (this type may hereinafter be referred to as an "opposite charge dual particle" medium) and/or magnitude. When such a dual particle medium is placed between the aforementioned pair of electrodes, depending upon the relative potentials of the two electrodes, the medium can display the optical characteristic of either set of particles, although the exact manner in which this is achieved differs depending upon whether the difference in mobility is in polarity or only in magnitude. For ease of illustration, consider an electrophoretic medium in which one type of particles is black and the other type white. If, as discussed in more detail below with reference to FIGS. 2A and 2B, the two types of particles differ in polarity (if, for example, the black particles are positively charged and the white particles negatively charged), the particles will be attracted to the two different electrodes, so that if, for example, the front electrode is negative relative to the rear electrode, the black particles will be attracted to the front electrode and the white particles to the rear electrode, so that the medium will appear black to the observer. Conversely, if the front electrode is positive relative to the rear electrode, the white particles will be attracted to the front electrode and the black particles to the rear electrode, so that the medium will appear white to the observer.

If, as discussed below with reference to FIGS. 3A and 3B, the two types of particles have charges of the same polarity, but differ in electrophoretic mobility (this type of medium may hereinafter to referred to as a "same polarity dual particle" medium), both types of particles will be attracted to the same electrode, but one type will reach the electrode before the other, so that the type facing the observer differs depending upon the electrode to which the particles are attracted. For example suppose the previous illustration is modified so that both the black and white particles are positively charged, but the black particles have the higher electrophoretic mobility. If now the front electrode is negative relative to the rear electrode, both the black and white particles will be attracted to the front electrode, but the black particles, because of their higher mobility will reach it first, so that a layer of black particles will coat the front electrode and the medium will appear black to the observer. Conversely, if the front electrode is positive relative to the rear electrode, both the black and white particles will be attracted to the rear electrode, but the black particles, because of their higher mobility will reach it first, so that a layer of black particles will coat the rear electrode, leaving a layer of white particles remote from the rear electrode and facing the observer, so that the medium will appear white to the observer: note that this type of dual particle medium requires that the suspending fluid be sufficiently transparent to allow the layer of white particles remote from the rear electrode to be readily visible to the observer. Typically, the suspending fluid in such a display is not colored at all, but some color may be incorporated for the purpose of correcting any undesirable tint in the white particles seen therethrough.

Both single and dual particle electrophoretic displays may be capable of intermediate gray states having optical characteristics intermediate the two extreme optical states already described.

Some of the aforementioned patents and published applications disclose encapsulated electrophoretic media having three or more different types of particles within each capsule. For purposes of the present application, such multi-particle media are regarded as sub-species of dual particle media.

Also, many of the aforementioned patents and applications recognize that the walls surrounding the discrete microcapsules in an encapsulated electrophoretic medium could be replaced by a continuous phase, thus producing a so-called "polymer-dispersed electrophoretic display" in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, WO 01/02899, at page 10, lines 6-19. See also copending application Ser. No. 09/683,903, filed Feb. 28, 2002 (Publication No. 2002/0131147), the entire disclosure of which is herein incorporated by reference, and the corresponding International Application PCT/US02/06393 (Publication No. WO 02/075443).

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; and other similar techniques.) Thus, the resulting display can be flexible. Further, because the display medium can be printed using a variety of methods, the display itself can be made inexpensively. However, the service life of encapsulated electrophoretic displays, of both the single and dual particle types, is still lower than is altogether desirable. It appears (although this invention is in no way limited by any theory as to such matters) that this service life is limited by factors such as sticking of the electrophoretic particles to the capsule wall, and the tendency of particles to aggregate into clusters which prevent the particles completing the movements necessary for switching of the display between its optical states. In this regard, opposite charge dual particle electrophoretic displays pose a particularly difficult problem, since inherently oppositely charged particles in close proximity to one another will be electrostatically attracted to each other and will display a strong tendency to form stable aggregates. Experimentally, it has been found that if one attempts to produce a black/white encapsulated display of this type using untreated commercially available titania and carbon black pigments, the display either does not switch at all or has a service life so short as to be undesirable for commercial purposes.

It has long been known that the physical properties and surface characteristics of electrophoretic particles can be modified by adsorbing various materials on to the surfaces of the particles, or chemically bonding various materials to these surfaces. For example, U.S. Pat. No. 4,285,801 (Chiang) describes an electrophoretic display composition in which the particles are coated with a highly fluorinated polymer, which acts as a dispersant, and which is stated to prevent the particles from flocculating and to increase their electrophoretic sensitivity. U.S. Pat. No. 4,298,448 (Müller et al.) describes an electrophoretic medium in which the particles are coated with an organic material, such as a wax, which is solid at the operating temperature of the medium but which melts at a higher temperature. The coating serves to lower the density of the electrophoretic particles and is also stated to increase the uniformity of the charges thereon. U.S. Pat. No. 4,891,245 describes a process for producing particles for use in electrophoretic displays, wherein a heavy, solid pigment, preferred for its high contrast or refractive index properties, is coated with a polymeric material. This process significantly reduces the specific density of the resultant particle, and is stated to create particles with smooth polymer surfaces that can be chosen for stability in a given electrophoretic carrier fluid, and possess acceptable electrophoretic characteristics. U.S. Pat. No. 4,680,103 (Beilin Solomon I et al.) describes a single particle electrophoretic display using inorganic pigment particles coated with an organosilane derivative containing quaternary ammonium groups; this coating is stated to provide quick release of the particles from the electrode adjacent the observer and resistance to agglomeration.

Later, it was found that simple coating of the electrophoretic particles with the modifying material was not entirely satisfactory since a change in operating conditions might cause part or all of the modifying material to leave the surface of the particles, thereby causing undesirable changes in the electrophoretic properties of the particles; the modifying material might possibly deposit on other surfaces within the electrophoretic display, which could give rise to further problems. Accordingly, techniques have been developed for securing the modifying material to the surface of the particles.

For example, U.S. Pat. No. 5,783,614 (Chen et al.) describes an electrophoretic display using diarylide yellow pigment particles modified with a polymer of pentafluorostyrene. The modified particles are produced by forming a mixture of the unmodified particles, the pentafluorostyrene monomer and a free radical initiator, and heating and agitating this mixture so that the monomer polymerizes in situ on the surface of the particles.

U.S. Pat. No. 5,914,806 (Gordon II et al.) describes electrophoretic particle formed by reacting pigment particles with a preformed polymer so that the polymer becomes covalently bonded to the surface of the particles. This process is of course restricted to pigments and polymers having chemical properties which allow the necessary reaction to form the covalent bond. Furthermore, a polymer with only a few sites capable of reacting with the particle material has difficulty in reacting with the solid interface at the particle surface; this can be due to polymer chain conformation in solution, steric congestion at the particle surface, or slow reactions between the polymer and the surface. Often, these problems restrict such reactions to short polymer chains, and such short chains typically only have a small effect on particle stability in electrophoretic media.

It is also known to use, in electrophoretic displays, particles consisting essentially of polymer; if dark colored particles are required, the polymer particles can be stained with a heavy metal oxide. See, for example, U.S. Pat. Nos. 5,360,689; 5,498,674; and 6,117,368. Although forming the electrophoretic particles from a polymer allows close control over the chemical composition of the particles, such polymer particles usually have much lower opacity than particles formed from inorganic pigments.

Despite the considerable amount of work which appears to have been done regarding attachment of modifying materials to electrophoretic particles, the prior art contains little discussion of the effects of varying amounts of modifying material upon the behavior of the particles, it apparently being assumed that the ideal is to achieve complete coverage of the electrophoretic particle with the modifying material. It has now been found that, at least with many polymeric modifying materials, this is not in fact the case, and that there is an optimum amount of polymer which should be deposited; too large a proportion of polymer in the modified particle causes an undesirable reduction in the electrophoretic mobility of the particle.

It has also been found that the structure of the polymer used to form the coating on the particle is important, and this invention relates to specific preferred forms of polymer for this purpose.

This invention also relates to preferred techniques for the formation of polymeric coatings on electrophoretic particles. At least some of the modified particles produced by these techniques may be useful in applications other than electrophoretic displays.

This invention also relates to preferred techniques for pretreatment of particles before formation of polymer coatings thereon.

SUMMARY OF THE INVENTION

In one aspect, this invention provides an electrophoretic medium comprising a plurality of pigment particles suspended in a suspending fluid, the pigment particles having from about 1 to about 15 per cent by weight of the pigment of a polymer chemically bonded to, or cross-linked around, the pigment particles. This aspect of the invention may hereinafter be referred to as a "controlled polymer electrophoretic medium" of the invention.

In another aspect, this invention provides an electrophoretic medium comprising a plurality of carbon black particles suspended in a suspending fluid, the particles having from about 1 to about 25 per cent by weight of the carbon black of a polymer chemically bonded to, or cross-linked around, the carbon black particles. This aspect of the invention may hereinafter be referred to as a "controlled polymer carbon black electrophoretic medium" of the invention.

In another aspect, this invention provides an electrophoretic medium comprising a plurality of pigment particles suspended in a suspending fluid, the pigment particles having a polymer chemically bonded to, or cross-linked around, the pigment particles, the polymer comprising a main chain and a plurality of side chains extending from the main chain, each of the side chains comprising at least about four carbon atoms. This aspect of the invention may hereinafter be referred to as a "branched chain polymer electrophoretic medium" of the invention.

In another aspect, this invention provides a two-phase electrophoretic medium comprising a continuous phase and a discontinuous phase, the discontinuous phase comprising a plurality of droplets, each of which comprises a suspending fluid and at least one pigment particle disposed within the suspending fluid and capable of moving through the fluid upon application of an electric field to the electrophoretic medium, the continuous phase surrounding and encapsulating the discontinuous phase, the pigment particle comprising a polymer chemically bonded to, or cross-linked around, the pigment particle. This aspect of the invention may hereinafter be referred to as a "polymer dispersed electrophoretic medium" of the invention.

In general, in the electrophoretic media of the present invention, it is preferred that the polymer be chemically bonded, especially covalently bonded, to the particle, rather than cross-linked around the particle.

In another aspect, this invention provides a pigment particle for use in an electrophoretic medium, the pigment particle having a polymer chemically bonded to, or cross-linked around, the pigment particle, the pigment particle also having a charged or chargeable group bonded to the pigment particle separately from the polymer. This aspect of the invention may hereinafter be referred to as a "separate charged group particle" of the invention.

In another aspect, this invention provides a process for producing a polymer-coated pigment particle, which process comprises:

(a) reacting the particle with a reagent having a functional group capable of reacting with, and bonding to, the particle, and also having a polymerizable or polymerization-initiating group, thereby causing the functional group to react with the particle surface and attach the polymerizable group thereto; and (b) reacting the product of step (a) with at least one monomer or oligomer under conditions effective to cause reaction between the polymerizable or polymerization-initiating group on the particle and the at least one monomer or oligomer, thereby causing the formation of polymer bonded to the particle.

This aspect of the invention may hereinafter be referred to as a "polymer coating process" of the invention.

In another aspect, this invention provides a process for coating a pigment particles with silica, the process comprising:

dispersing the pigment particles in a solution of a soluble silicate at a pH above about 8 and a temperature above about 60° C.;

adding to the dispersion of the pigment particles both a solution of an acid and a solution of a soluble silicate while maintaining the temperature of the dispersion above about 60° C., thereby causing deposition of silica on to the particles; and lowering the pH of the dispersion below about 4, and thereafter separating the silica-coated particles from the liquid.

This aspect of the invention may hereinafter be referred to as a "silica coating process" of the invention.

In a further aspect of the present invention, the electrophoretic medium used may be of the type described in claim 1 of the aforementioned U.S. Pat. No. 5,930,026. Thus, this invention provides an electrophoretic display comprising:

a) an arrangement of microscopic containers, wherein each container comprises a dielectric fluid and a suspension of particles having attached at least one organic group, wherein said organic group includes at least one ionic group, ionizable group, or both, wherein said fluid and said particles contrast visually;

b) first and second electrodes wherein said arrangement is located between said electrodes and wherein at least one of the electrodes is substantially visually transparent; and c) means for creating a potential difference between the two electrodes, wherein said potential difference causes said particles to migrate towards one of the electrodes.

Finally, the electrophoretic medium used may be of the type described in claim 21 of the aforementioned U.S. Pat. No. 5,930,026. Thus, this invention provides a non-emissive display system comprising:

a) at least one display element located between two electrodes wherein the display element is visually responsive to a potential difference between the electrodes; and b) a display piezoelectric element connected to the electrodes wherein deformation of the piezoelectric element produces the potential difference;

wherein said display element comprises an arrangement of microscopic containers, wherein each container comprises a dielectric fluid and a suspension of particles having attached at least one organic group, wherein said organic group includes at least one ionic, ionizable group, or both, wherein said fluid and said particles contrast visually.

BRIEF DESCRIPTION OF DRAWINGS

Preferred embodiments of the invention will now be described, though by way of illustration only, with reference to the accompanying drawings, in which:

FIGS. 1A and 1B are schematic cross-sections through a first electrophoretic display of the present invention in which the electrophoretic medium comprises a single type of particle in a colored suspending fluid;

FIGS. 2A and 2B are schematic cross-sections, generally similar to those of FIGS. 1A and 1B respectively through a second electrophoretic display of the present invention in which the electrophoretic medium comprises two different types of particle, bearing charges of opposite polarity, in an uncolored suspending fluid;

Figure 3A:
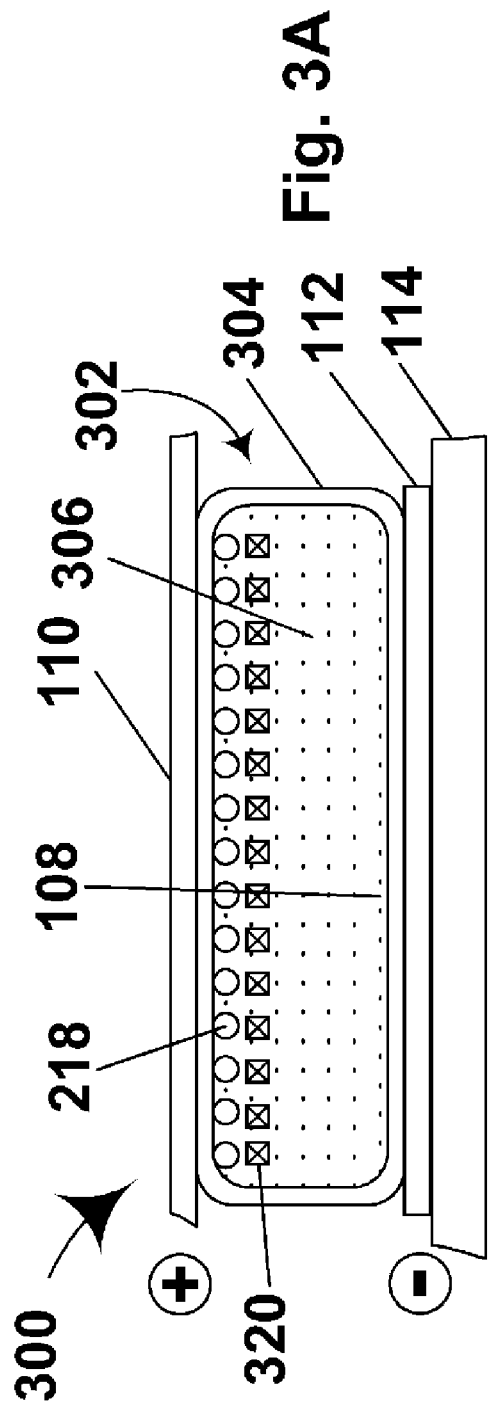
FIGS. 3A and 3B are schematic cross-sections, generally similar to those of FIGS. 2A and 2B respectively through a third electrophoretic display of the present invention in which the electrophoretic medium comprises two different types of particle, bearing charges of the same polarity but differing in electrophoretic mobility, in an uncolored suspending fluid.

The accompanying drawings are not strictly to scale, emphasis instead generally being placed upon illustrating the principles of the invention.

DETAILED DESCRIPTION

Before discussing the electrophoretic media and processes of the present invention in detail, it is believed desirable to briefly describe some of the types of electrophoretic displays in which these media are intended to be used.

The electrophoretic medium of the present invention may be of any of the types described in the aforementioned E Ink and MIT patents and applications, and preferred embodiments of such media will now be described with reference to FIGS. 1 to 4 of the accompanying drawings.

The first electrophoretic display (generally designed 100) of the invention shown in FIGS. 1A and 1B comprises an encapsulated electrophoretic medium (generally designated 102) comprising a plurality of capsules 104 (only one of which is shown in FIGS. 1A and 1B), each of which contains a suspending liquid 106 and dispersed therein a plurality of a single type of particle 108, which for purposes of illustration will be assumed to be black. The particles 108 are electrophoretically mobile and may be formed of carbon black. In the following description, it will be assumed that the particles 108 are positively charged, although of course negatively charged particles could also be used if desired. (The triangular shape of the particles 108, and the square and circular shapes of other particles discussed below, are used purely to way of illustration to enable the various types of particles to be distinguished easily in the accompanying drawings, and in no way correspond to the physical forms of the actual particles, which are typically substantially spherical. However, we do not exclude the use of non-spherical particles in the present displays.) The display 100 further comprises a common, transparent front electrode 110, which forms a viewing surface through which an observer views the display 100, and a plurality of discrete rear electrodes 112, each of which defines one pixel of the display 100 (only one rear electrode 112 is shown in FIGS. 1A and 1B). For ease of illustration and comprehension, FIGS. 1A and 1B show only a single microcapsule forming the pixel defined by rear electrode 112, although in practice a large number (20 or more) microcapsules are normally used for each pixel. The rear electrodes 112 are mounted upon a substrate 114.

The suspending liquid 106 is colored such that the particles 108 lying in the positions shown in FIG. 1A adjacent the rear electrodes 112 are not visible to an observer viewing the display 100 via the front electrode 110. The necessary color in the suspending liquid 106 may be provided by dissolving a dye in the liquid. Since the colored suspending liquid 106 and the particles 108 render the electrophoretic medium 102 opaque, the rear electrodes 112 and the substrate 114 can be transparent or opaque since they are not visible through the opaque electrophoretic medium 102.

The capsules 104 and the particles 108 can be made in a wide range of sizes. However, in general it is preferred that the thickness of the capsules, measured perpendicular to the electrodes, be in the range of about 15 to 500 μm, while the particles 108 will typically have diameters in the range of about 0.25 to about 2 μm.

FIG. 1A shows the display 100 with the rear electrode 112 negatively charged and the front electrode 110 positively charged. Under this condition, the positively-charged particles 108 are attracted to the negative rear electrode 112 and thus lie adjacent the rear electrode 112, where they are hidden from an observer viewing the display 100 through the front electrode 110 by the colored liquid 106. Accordingly, the pixel shown in FIG. 1A displays to the observer the color of the liquid 106, which for purposes of illustration will be assumed to be white. (Although the display 100 is illustrated in FIGS. 1A and 1B with the rear electrodes 112 at the bottom, in practice both the front and rear electrodes are typically disposed vertically for maximum visibility of the display 100. In general, the media and displays of the invention described herein do not rely in any way upon gravity to control the movement of the particles; such movement under gravity is in practice far too slow to be useful for controlling particle movement.)

FIG. 1B shows the display 100 with the front electrode 110 made negative relative to the rear electrode 112. Since the particles 108 are positively charged, they will be attracted to the negatively-charged front electrode 110, and thus the particles 108 move adjacent the front electrode 110, and the pixel displays the black color of the particles 108.

In FIGS. 1A and 1B, the capsules 104 are illustrated as being of substantially prismatic form, having a width (parallel to the planes of the electrodes) significantly greater than their height (perpendicular to these planes). This prismatic shape of the capsules 104 is deliberate. If the capsules 104 were essentially spherical, in the black state shown in FIG. 1B, the particles 108 would tend to gather in the highest part of the capsule, in a limited area centered directly above the center of the capsule. The color seen by the observer would then be essentially the average of this central black area and a white annulus surrounding this central area, where the white liquid 106 would be visible. Thus, even in this supposedly black state, the observer would see a grayish color rather than a pure black, and the contrast between the two extreme optical states of the pixel would be correspondingly limited. In contrast, with the prismatic form of microcapsule shown in FIGS. 1A and 1B, the particles 108 cover essentially the entire cross-section of the capsule so that no, or at least very little white liquid is visible, and the contrast between the extreme optical states of the capsule is enhanced. For further discussion on this point, and on the desirability of achieving close-packing of the capsules within the electrophoretic layer, the reader is referred to the aforementioned U.S. Pat. No. 6,067,185, and the corresponding published International Application WO 99/10767. Also, as described in the aforementioned E Ink and MIT patents and applications, to provide mechanical integrity to the electrophoretic medium, the microcapsules are normally embedded within a solid binder, but this binder is omitted from FIGS. 1 to 3 for ease of illustration.

The second electrophoretic display (generally designed 200) of the invention shown in FIGS. 2A and 2B comprises an encapsulated electrophoretic medium (generally designated 202) comprising a plurality of capsules 204, each of which contains a suspending liquid 206 and dispersed therein a plurality of positively charged black particles 108 identical discussed to those in the first display 100 discussed above. The display 200 further comprises a front electrode 110, rear electrodes 112, and a substrate 114, all of which are identical to the corresponding integers in the first display 100. However, in addition to the black particles 108, there are suspended in the liquid 206 a plurality of negatively charged, particles 218, which for present purposes will be assumed to be white.

Typically the liquid 206 is uncolored (i.e., essentially transparent), although some color may be present therein to adjust the optical properties of the various states of the display. FIG. 2A shows the display 200 with the front electrode 110 positively charged relative to the rear electrode 112 of the illustrated pixel. The positively charged particles 108 are held electrostatically adjacent the rear electrode 112, while the negatively charged particles 218 are held electrostatically against the front electrode 110. Accordingly, an observer viewing the display 200 through the front electrode 110 sees a white pixel, since the white particles 218 are visible and hide the black particles 108.

FIG. 2B shows the display 200 with the front electrode 110 negatively charged relative to the rear electrode 112 of the illustrated pixel. As in the corresponding optical state shown in FIG. 1B, the positively charged particles 108 are now electrostatically attracted to the negative front electrode 110, while the negatively charged particles 218 are electrostatically attracted to the positive rear electrode 112. Accordingly, the particles 108 move adjacent the front electrode 110, and the pixel displays the black color of the particles 108, which hide the white particles 218.

Figure 3B:
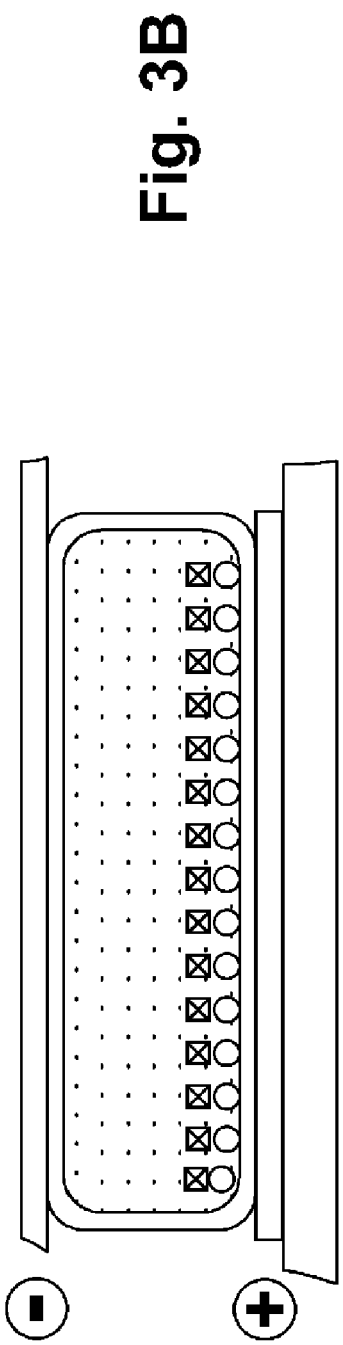

The third electrophoretic display (generally designated 300) of the invention shown in FIGS. 3A and 3B comprises an encapsulated electrophoretic medium (generally designated 302) comprising a plurality of capsules 304. The display 300 further comprises a front electrode 110, rear electrodes 112, and a substrate 114, all of which are identical to the corresponding integers in the displays 100 and 200 previously described. The display 300 resembles the display 200 described above in that the liquid 306 is uncolored and that white negatively charged particles 218 are suspended therein. However, that the display 300 differs from the display 200 by the presence of red negatively charged particles 320, which have a substantially lower electrophoretic mobility than the white particles 218.

FIG. 3A shows the display 300 with the front electrode 110 positively charged relative to the rear electrode 112 of the illustrated pixel. Both the negatively charged white particles 218 and the negatively charged red particles 320 are attracted to the front electrode 110, but since the white particles 218 have substantially higher electrophoretic mobility, that they reach the front electrode 110 first (note that the optical state shown in FIG. 3A is normally generated by abruptly reversing the polarity off the electrodes in the optical state shown in FIG. 3B, thus forcing both the white particles 218 and the red particles 320 to traverse the thickness of the capsule 304, and thus allowing the greater mobility of the white particles 218 to cause them to reach their positions adjacent the front electrode 110 before the red particles 320). Thus, the white particles 218 form a continuous layer immediately adjacent the front electrode 110, thereby hiding the red particles 320. Accordingly, an observer viewing the display 300 through the front electrode 110 sees a white pixel, since the white particles 218 are visible and hide the red particles 320.

FIG. 3B shows the display 300 with the front electrode 110 negatively charged relative to the rear electrode 112 of the illustrated pixel. Both the negatively charged white particles 218 and the negatively charged red particles 320 are attracted to the rear electrode 112, but since the white particles have higher electrophoretic mobility, when the optical state shown in FIG. 3B is produced by reversing the polarity on the electrodes in the optical state shown in FIG. 3A, the white particles 218 reach the rear electrode 112 more quickly than do the red particles 320, so that the white particles 218 form a continuous layer adjacent the electrode 112, leaving a continuous layer of the red particles 320 facing the front electrode 110. Accordingly, an observer viewing the display 300 through the front electrode 110 sees a red pixel, since the red particles 320 are visible and hide the white particles 218.

Figure 4A:
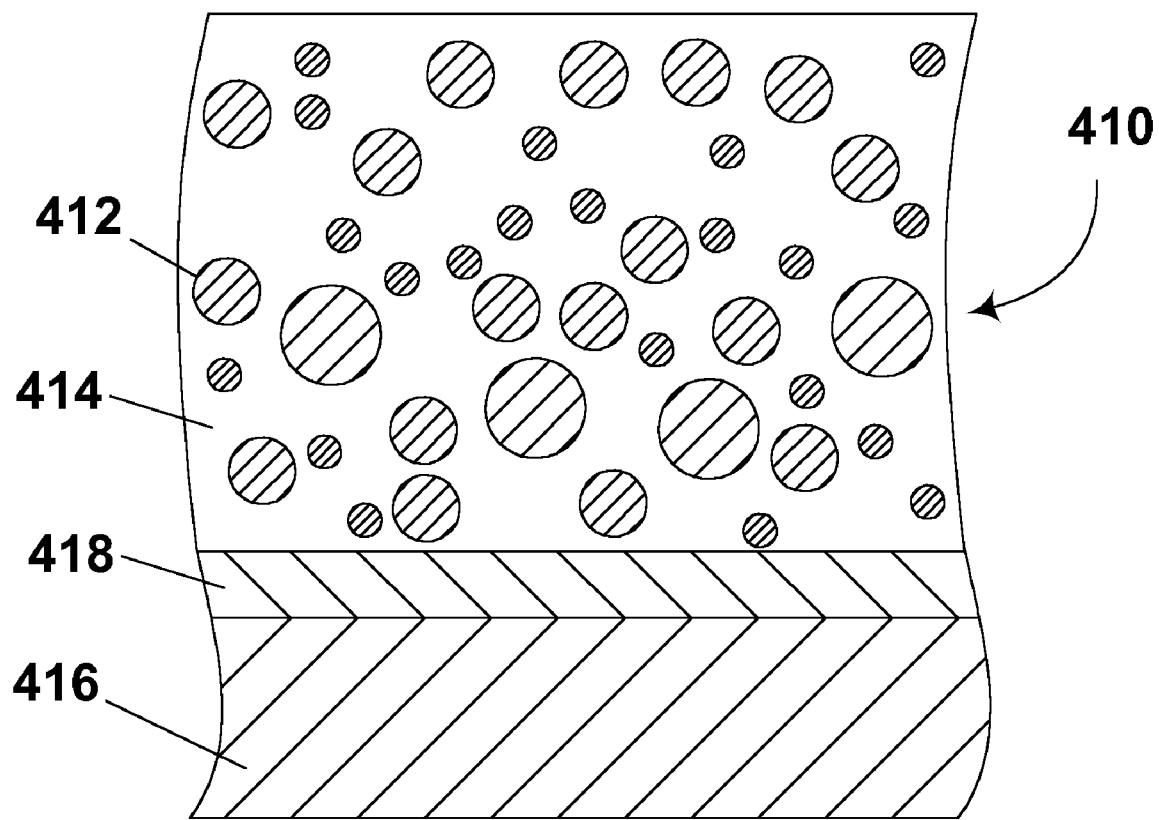
FIGS. 4A and 4B illustrate a polymer-dispersed electrophoretic medium of the present invention and the process used to produce this medium.
Figure 4B:
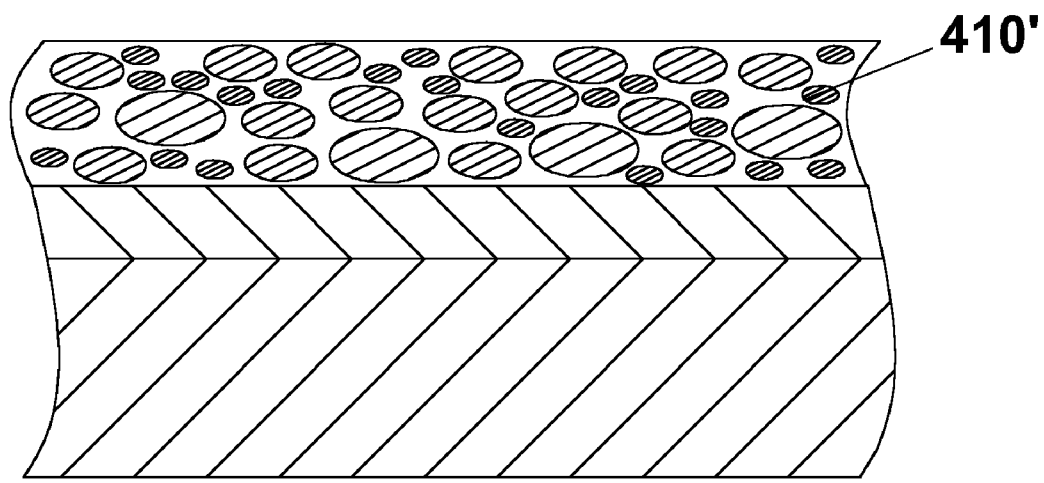

FIGS. 4A and 4B illustrate a polymer-dispersed electrophoretic medium of the present invention and the process used to produce this medium. This polymer-dispersed medium contains non-spherical droplets and is prepared by using a film-forming material which produces a film capable of being shrunk substantially after its formation. The preferred discontinuous phase for this purpose is gelatin, although other proteinaceous materials, and possibly cross-linkable polymers may alternatively be employed. A mixture of the liquid material (which will eventually form the continuous phase) and the droplets is formed and coated on to a substrate to form a structure as illustrated in FIG. 4A. FIG. 4A shows a layer 410 comprising droplets 412 dispersed in a liquid medium 414 which is in the process of forming a film, this layer 410 having been coated on a substrate 416 (preferably a flexible polymeric film, such as a polyester film) previously provided with a layer 418 of a transparent electrically conductive material, such as indium-tin oxide. The liquid material forms a relatively thick layer 410 containing essentially spherical droplets 412; as shown in FIG. 4A. After the layer 410 has formed a solid continuous phase, the layer is then allowed to dry, preferably at about room temperature (although the layer may be heated if desired) for a period sufficient to dehydrate the gelatin, thus causing substantial reduction in the thickness of the layer and producing the type of structure illustrated in FIG. 4B, the dried and shrunken layer being designated 410' in FIG. 4B. The vertical shrinkage of the layer (i.e., the shrinkage perpendicular to the surface of the substrate 416) in effect compresses the original spherical droplets into oblate ellipsoids whose thickness perpendicular to the surface is substantially smaller than their lateral dimensions parallel to the surface. In practice, the droplets are normally sufficiently closely packed that the lateral edges of adjacent droplets contact each other, so that the final forms of the droplets more closely resemble irregular prisms than oblate ellipsoids. Also as shown in FIG. 4B, more than one layer of droplets may be present in the final medium. When the medium is of the type shown in FIG. 4B in which the droplets are polydisperse (i.e., a wide range of droplet sizes are present), the presence of such multiple layers is advantageous in that it reduces the chance that small areas of the substrate will not be covered by any droplet; hence, the multiple layers help to ensure that the electrophoretic medium is completely opaque and that no part of the substrate is visible in a display formed from the medium. However, in a medium using essentially monodisperse droplets (i.e., droplets all of substantially the same size), it will generally be advisable to coat the medium in a layer which, after shrinkage, will produce a close-packed monolayer of droplets, cf. copending application Ser. No. 09/413,444, filed Oct. 6, 1999 (Publication No. 2003/0137717), and the corresponding International Application No. PCT/US99/ 23313, Publication No. WO 00/20922. Because they lack the relatively rigid microcapsule walls found in microencapsulated electrophoretic media, the droplets in polymer-dispersed media of the present invention may tend to pack more tightly into a close-packed monolayer than do microcapsules.

Contrary to what might be expected, experimentally it has been found that the droplets do not coalesce during the drying of the medium. However, we do not exclude the possibility that, in certain embodiments of the invention some rupturing of the walls between adjacent capsules might occur, thus providing a partial connection between droplets.

The degree of deformation of the droplets which occurs during the drying step, and hence the final forms of the droplets, may be varied by controlling the proportion of water in the gelatin solution and the ratio of this solution to the droplets. For example, experiments were conducted using gelatin solutions of from 2 to 15 percent by weight, and using 200 grams of each gelatin solution and 50 grams of the internal non-aqueous phase which forms the droplets. To produce a final layer of electrophoretic medium 30 μm in thickness, it was necessary to coat a layer of the 2 per cent gelatin solution/internal phase mixture 139 μm in thickness; upon drying, this layer produced an electrophoretic medium 30 μm in thickness containing 92.6 percent by volume of droplets. On the other hand, to produce the same final thickness of electrophoretic medium, the 15 percent gelatin solution/internal phase mixture was coated at a thickness of 93 μm, and upon drying produced an electrophoretic medium containing 62.5 percent by volume of droplets. The medium produced from the 2 percent gelatin solution was weaker than is desirable to withstand robust handling; media produced from gelatin solutions containing from 5 to 15 percent by weight of gelatin had satisfactory mechanical properties.

The degree of deformation of the droplets in the final electrophoretic medium is also affected by the initial size of the droplets, and the relationship between this initial size and the thickness of the final layer of electrophoretic medium. Experiments indicate that the larger the average initial size of the droplets and/or the larger the ratio of this average initial size to the thickness of the final layer, the greater is the deformation of the droplets from a spherical shape in the final layer. In general, it is preferred that the average initial size of the droplets be from about 25 percent to about 400 percent of the thickness of the final layer. For example, in the experiments previously described, in which the thickness of the final layer was 30 μm, good results were obtained with an initial average droplet size of 10 to 100 μm.

Gelatin forms a film by a sol/gel transformation, but the present invention is not restricted to film-forming materials which form their films by such sol/gel transformation. For example, the formation of the film may be accomplished by the polymerization of a monomer or oligomer, by the cross-linking of a polymer or oligomer, by radiation-curing of a polymer or by any other known film-forming process. Similarly, in the preferred variant of the invention in which the film is first formed and then caused to shrink in thickness, this shrinkage need not accomplished by the same type of dehydration mechanism by which a gelatin film shrinks, but may be accomplished by removal of a solvent, aqueous or non-aqueous, from the film, cross-linking of a polymeric film or any other conventional procedure.

In a polymer-dispersed electrophoretic medium of the present invention, the droplets desirably comprise at least about 40 per cent, and preferably about 50 to about 80 per cent, by volume of the electrophoretic medium; see the aforementioned copending application Ser. No. 09/683,903. It should be stressed that the droplets used in the polymer-dispersed media of the present invention may have any of the combinations of particles and suspending fluids illustrated in FIGS. 1 to 3.

The present invention may be applied to any of the forms of encapsulated electrophoretic media shown in FIGS. 1 to 4. However, the present invention is not restricted to encapsulated and polymer-dispersed electrophoretic media, and may also be applied to unencapsulated media.

The various aspects of the present invention will now be described in more detail.

Types of Particles and Pre-treatment thereof

The present invention may be applied to any type of particle useable in electrophoretic media, and there is much flexibility in the choice of such particles. For purposes of this invention, a particle is any component that is charged or capable of acquiring a charge (i.e., has or is capable of acquiring electrophoretic mobility), and, in some cases, this mobility may be zero or close to zero (i.e., the particles will not move). The particles may be, for example, neat pigments or dyed (laked) pigments, or any other component that is charged or capable of acquiring a charge. Typical considerations for the electrophoretic particle are its optical properties, electrical properties, and surface chemistry. The particles may be organic or inorganic compounds, and they may either absorb light or scatter light. The particles for use in the invention may further include scattering pigments, absorbing pigments and luminescent particles. The particles may be retroreflective, such as corner cubes, or they may be electroluminescent, such as zinc sulfide particles, which emit light when excited by an AC field, or they may be photoluminescent. Zinc sulfide electroluminescent particles may be encapsulated with an insulative coating to reduce electrical conduction.

The electrophoretic particle is usually a pigment, a laked pigment, or some combination of the above. A neat pigment can be any pigment, and, usually for a light colored particle, pigments such as rutile (titania), anatase (titania), barium sulfate, kaolin, or zinc oxide are useful. Some typical particles have high refractive indices, high scattering coefficients, and low absorption coefficients. Other particles are absorptive, such as carbon black or colored pigments used in paints and inks. The pigment should also be insoluble in the suspending fluid. Yellow pigments such as diarylide yellow, Hansa yellow, and benzidin yellow have also found use in similar displays. Any other reflective material can be employed for a light colored particle, including non-pigment materials, such as metallic particles.

Useful neat pigments include, but are not limited to, $PbCrO_4$, Cyan blue GT 55-3295 (American Cyanamid Company, Wayne, N.J.), Cibacron Black BG (Ciba Company, Inc., Newport, Del.), Cibacron Turquoise Blue G (Ciba), Cibalon Black BGL (Ciba), Orasol Black BRG (Ciba), Orasol Black RBL (Ciba), Acetamine Black, CBS (E. I. du Pont de Nemours and Company, Inc., Wilmington, Del., hereinafter abbreviated "du Pont"), Crocein Scarlet N Ex (du Pont) (27290), Fiber Black VF (du Pont) (30235), Luxol Fast Black L (du Pont) (Solv. Black 17), Nirosine Base No. 424 (du Pont) (50415 B), Oil Black BG (du Pont) (Solv. Black 16), Rotalin Black RM (du Pont), Sevron Brilliant Red 3 B (du Pont); Basic Black DSC (Dye Specialties, Inc.), Hectolene Black (Dye Specialties, Inc.), Azosol Brilliant Blue B (GAF, Dyestuff and Chemical Division, Wayne, N.J.) (Solv. Blue 9), Azosol Brilliant Green BA (GAF) (Solv. Green 2), Azosol Fast Brilliant Red B (GAF), Azosol Fast Orange RA Conc. (GAF) (Solv. Orange 20), Azosol Fast Yellow GRA Conc. (GAF) (13900 A), Basic Black KMPA (GAF), Benzofix Black CW-CF (GAF) (35435), Cellitazol BNFV Ex Soluble CF (GAF) (Disp. Black 9), Celliton Fast Blue AF Ex Conc (GAF) (Disp. Blue 9), Cyper Black IA (GAF) (Basic Black 3), Diamine Black CAP Ex Conc (GAF) (30235), Diamond Black EAN Hi Con. CF (GAF) (15710), Diamond Black PBBA Ex (GAF) (16505); Direct Deep Black EA Ex CF (GAF) (30235), Hansa Yellow G (GAF) (11680); Indanthrene Black BBK Powd. (GAF) (59850), Indocarbon CLGS Conc. CF (GAF) (53295), Katigen Deep Black NND Hi Conc. CF (GAF) (15711), Rapidogen Black 3 G (GAF) (Azoic Black 4); Sulphone Cyanine Black BA-CF (GAF) (26370), Zambezi Black VD Ex Conc. (GAF) (30015); Rubanox Red CP-1495 (The Sherwin-Williams Company, Cleveland, Ohio) (15630); Raven 11 (Columbian Carbon Company, Atlanta, GA), (carbon black aggregates with a particle size of about 25 μm), Statex B-12 (Columbian Carbon Co.) (a furnace black of 33 μm average particle size), Greens 223 and 425 (The Shepherd Color Company, Cincinnati, Ohio 45246); Blacks 1, 1G and 430 (Shepherd); Yellow 14 (Shepherd); Krolor Yellow KO-788-D (Dominion Colour Corporation, North York, Ontario; "KROLOR" is a Registered Trade Mark); Red Synthetic 930 and 944 (Alabama Pigments Co., Green Pond, Ala. 35074), Krolor Oranges KO-786-D and KO-906-D (Dominion Colour Corporation); Green GX (Bayer); Green 56 (Bayer); Light Blue ZR (Bayer); Fast Black 100 (Bayer); Bayferrox 130M (Bayer "BAYFERROX" is a Registered Trade Mark); Black 444 (Shepherd); Light Blue 100 (Bayer); Light Blue 46 (Bayer); Yellow 6000 (First Color Co., Ltd., 1236-1, Jwungwang-dong, Shihung, Kyounggi-do, Korea), Blues 214 and 385 (Shepherd); Violet 92 (Shepherd); and chrome green.

Particles may also include laked, or dyed, pigments. Laked pigments are particles that have a dye precipitated on them or which are stained. Lakes are metal salts of readily soluble anionic dyes. These are dyes of azo, triphenylmethane or anthraquinone structure containing one or more sulphonic or carboxylic acid groupings. They are usually precipitated by a calcium, barium or aluminum salt onto a substrate. Typical examples are peacock blue lake (CI Pigment Blue 24) and Persian orange (lake of CI Acid Orange 7), Black M Toner (GAF) (a mixture of carbon black and black dye precipitated on a lake).

A dark particle of the dyed type may be constructed from any light absorbing material, such as carbon black, or inorganic black materials. The dark material may also be selectively absorbing. For example, a dark green pigment may be used.

The optical purpose of the particle may be to scatter light, absorb light, or both. Useful sizes may range from 1 nm up to about 100 μm. The density of the electrophoretic particle may be substantially matched to that of the suspending (i.e., electrophoretic) fluid. As defined herein, a suspending fluid has a density that is "substantially matched" to the density of the particle if the difference in their respective densities is between about zero and about two grams/milliliter ("g/ml"). This difference is preferably between about zero and about 0.5 g/ml.

New and useful electrophoretic particles may still be discovered, but a number of particles already known to those skilled in the art of electrophoretic displays and liquid toners can also prove useful.

The presently preferred materials for forming light-colored electroparticles are metal oxides (and/or hydroxides), especially titania. The titania particles may be coated with an oxide, such as alumina or silica, for example; the presence of such coatings appears to improve the stability of the titania in electrophoretic media, presumably by suppressing reactions, such as photochemical reactions, which may occur at the interface between a bare titania surface and the suspending fluid. The titania particles may have one, two, or more layers of metal-oxide coating. For example, a titania particle for use in electrophoretic displays of the invention may have a coating of alumina and a coating of silica. The coatings may be added to the particle in any order. At present we prefer to use a titania having a silica/alumina coating, which appears to contain discrete areas of silica and alumina. Such a coated titania is commercially available from E.I. du Pont de Nemours and Company, Wilmington, Del., under the trade name R960. It will be appreciated that since, in such coated particles, the coating completely covers the titania, any reagent used to attach an initiator or polymerizable group to the surface of the particle must react with the coating, and need not be capable of reacting with titania. Furthermore, since the preferred silane coupling agents discussed below react with silica but less readily or not at all with alumina, if these preferred agents are to be used, the particle surface should have at least some areas of exposed silica. Indeed, it is one important advantage of the present invention that, since techniques for forming silica coatings on pigments are described in the literature (see, for example, U.S. Pat. No. 3,639,133), and, as illustrated below, such techniques may readily be adapted to produce silica coatings on a wide variety of materials, the present processes can readily be adapted to utilize any of these materials by first providing a silica coating thereon. Once the silica coating has been applied, the remaining steps in forming the polymer-coated particles are essentially similar, since the reagents used "see" only the silica coating, so that the chemical process steps are essentially independent of the chemical nature of the pigment underlying the silica coating.

As already indicated, the present invention provides a preferred technique, designated the silica coating process of the present invention, for forming silica coatings on particles which do not already possess such coatings. Typically, in prior art processes such as those described in the aforementioned U.S. Pat. No. 3,639,133, the silica coated pigment is separated from the reaction mixture in which it is produced (this reaction mixture having a pH of about 9.5 to 10), then washed and dried, for example at 80° C. This tends to result is pigment particles which are fused together by their silica coatings. This fusion or aggregation makes it extremely difficult to redisperse the pigment into its primary particulate form without using a harsh treatment such as attrition, ball milling or homogenization, and such harsh treatment may fracture the silica coating, thus lowering the number of reactive sites on the pigment particle at which polymer chains can be formed.

It has now been discovered that if, after the deposition of the silica coating is completed, the pH of the reaction mixture is reduced below about 4, and preferably to about 3, before the silica-coated particles are separated from the reaction mixture, the tendency for the particles to fuse together is essentially eliminated. The necessary reduction in pH is conveniently effected using sulfuric acid, although other acids, for example, nitric, hydrochloric and perchloric acids, may be used. The particles are conveniently separated from the reaction mixture by centrifugation. Following this separation, it is not necessary to dry the particles. Instead, the silica-coated particles can be readily re-dispersed in the medium, typically an aqueous alcoholic medium, to be used for the next step of the process for the formation of polymer on the particles. This enables the silica-coated pigment particles to be maintained in a non-agglomerated and non-fused form as they are subjected to the processes for attachment of polymerizable or polymerization-initiating groups, thus allowing for thorough coverage of the pigment particle with such groups, and preventing the formation of large aggregates of pigment particles in the microcapsules which will typically eventually be formed from the silica-coated pigment. Preventing the formation of such aggregates is especially important when the silica-coated pigment is to be used in small microcapsules (less than about 100 μm in diameter), and such small microcapsules are desirable since they reduce the operating voltage and/or switching time of the electrophoretic medium. Also, eliminating the drying procedures previously used in forming silica-coated pigments substantially reduces the processing time required.

The presently preferred material for forming dark-colored electroparticles is carbon black, for example the material sold commercially by Degussa A G, Düsseldorf, Germany under the trade name Printex A.

Processes of the Present Invention

Before explaining in detail the various steps of the present processes, a summary of the numerous possible variations in such processes will be given.

Figure 5A:
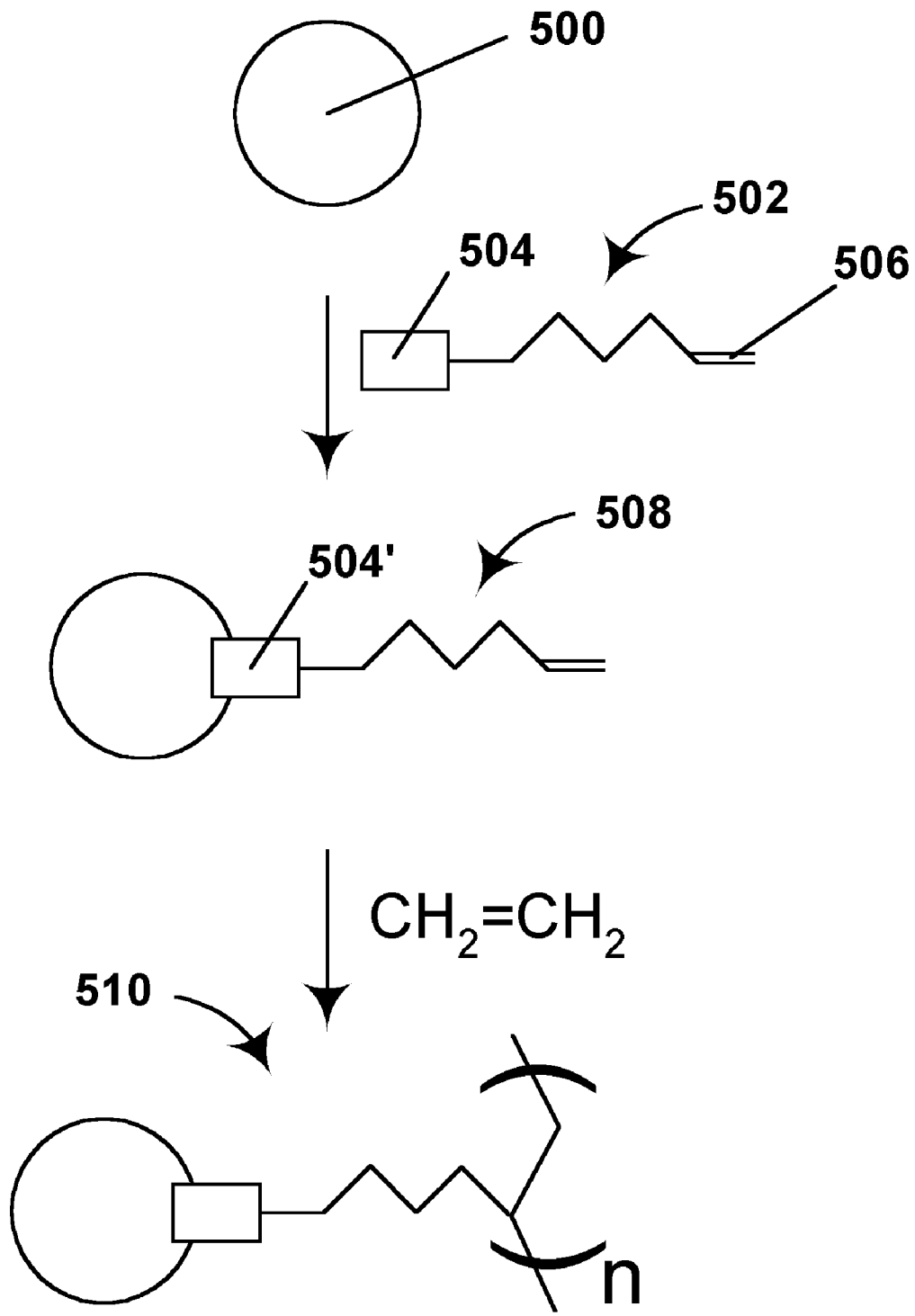
FIGS. 5A, 5B and 5C are reaction schemes summarizing some of the processes used in the present invention to apply polymer coating to pigment particles.

In a first process of the invention (hereinafter called the "random graft polymerization" or "RGP" process of the invention), as illustrated in FIG. 5A, a particle 500 is reacted with a reagent 502 having a functional group 504 capable of reacting with, and bonding to, the particle and with a polymerizable group, for example a pendant vinyl or other ethylenically unsaturated group 506. (The shapes used to indicate the functional group 504 and other functional groups discussed below are used only to make it easier to illustrate the reactions involved and, of course, bear no relationship to the actual physical shapes of the functional groups.) The functional group reacts 504 with the particle surface, leaving a residue indicated at 504' attached to the particle and also leaving the polymerizable group 506 covalently bonded to the particle surface and free to participate in a subsequent polymerization reaction; in effect, the entire treated particle 508 becomes a polymerizable "monomer". The particle 508 carrying the polymerizable group is then treated with one or more polymerizable monomers or oligomers under conditions effective to cause reaction between the polymerizable group 506 on the particles and the monomer(s) or oligomer(s); such conditions will, of course, typically include the presence of a polymerization initiator, although in some cases the polymerization may be initiated thermally, with no initiator present. As indicated at 510 in FIG. 5A, the resultant polymerization reaction produces polymer chains which include at least one residue from a polymerizable group previously attached to the particle; if, as is usually the case, multiple polymerizable groups are attached to the particle in the first stage of the process, the residues of two or more of these polymerizable groups may be incorporated into the same polymer chain, which will thus be attached to the particle surface at two or more points.

Figure 6:
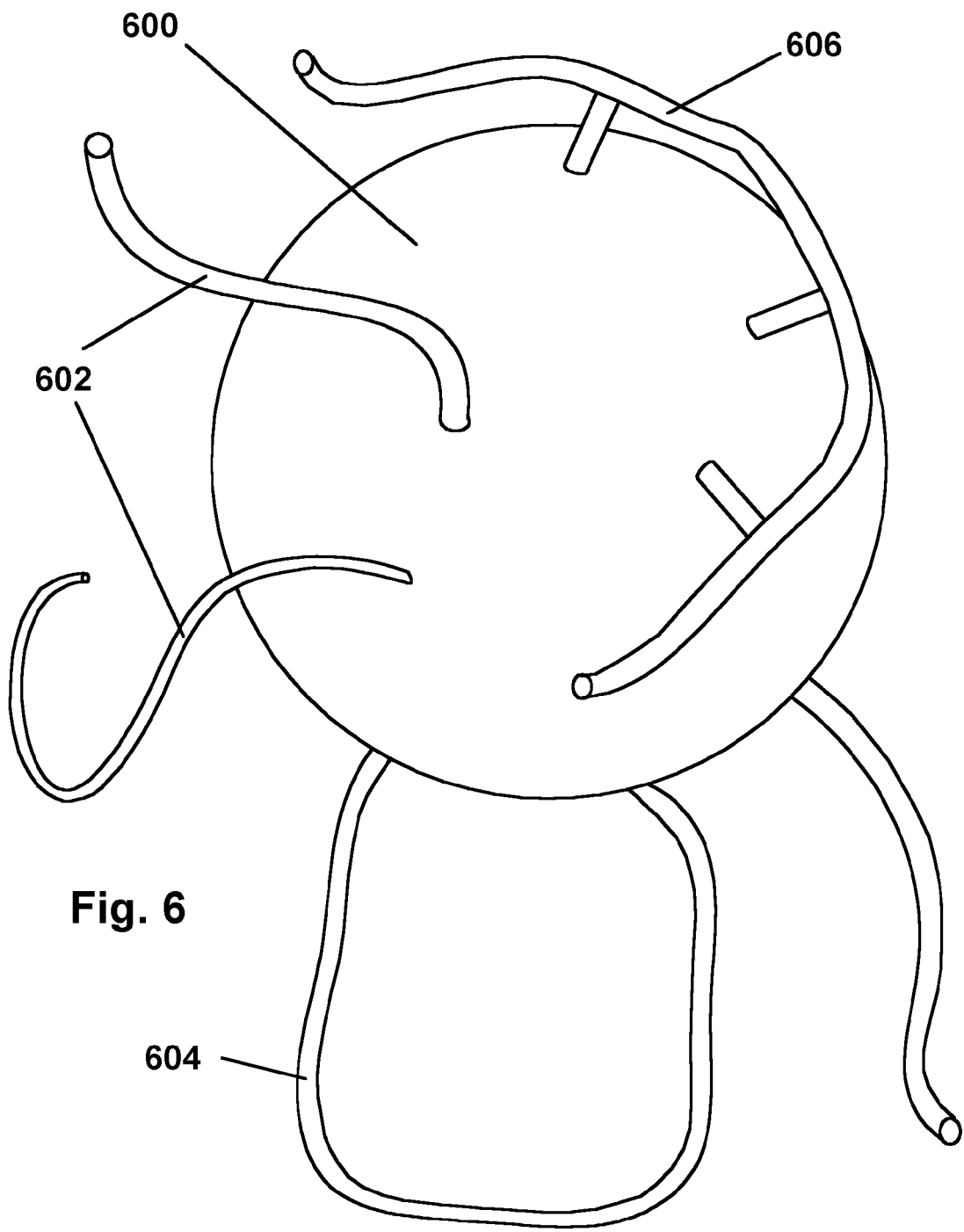
FIG. 6 is a schematic illustration of the type of polymer coating which is believed to be produced by one of the processes of the present invention.

This is illustrated in FIG. 6, which shows in a highly schematic manner (in practice, the titania particle will be much larger relative to the polymer chains, and far more polymer chains than shown would normally be attached to a single particle), a structure which is believed to be typical of polymer-coated particles produced by the present invention. FIG. 6 shows a pigment particle 600 bearing multiple polymer chains, including chains 602 which are attached via only one of their ends to the particle 600, a chain 604 which is attached via both its ends to the particle 600 and a chain 606 which has both ends free but which is attached to the particle 600 at multiple points intermediate its ends. It will be apparent to those skilled in polymer synthesis that other types of polymer chains could be present; for example, a chain could be attached to the particle 600 at both ends and at one or more intermediate points, or a chain could be attached to the particle 600 at one end and one or more intermediate points, but have its opposed end free from the particle 600. It is believed (although the invention is in no way limited by this belief) that the presence of multiply-attached polymer chains is especially advantageous for stabilizing particles used in electrophoretic media. Note also that, as illustrated in FIG. 6, and as may be confirmed experimentally by measuring the absorption of gases on the polymer-coated pigment particles, the polymer does not completely cover the surface of the particle 600. It is believed (although the invention is in no way limited by this belief) that this incomplete coverage of the surfaces of the pigment particles by the polymer is important is providing particles with good electrophoretic properties.

Figure 5B:
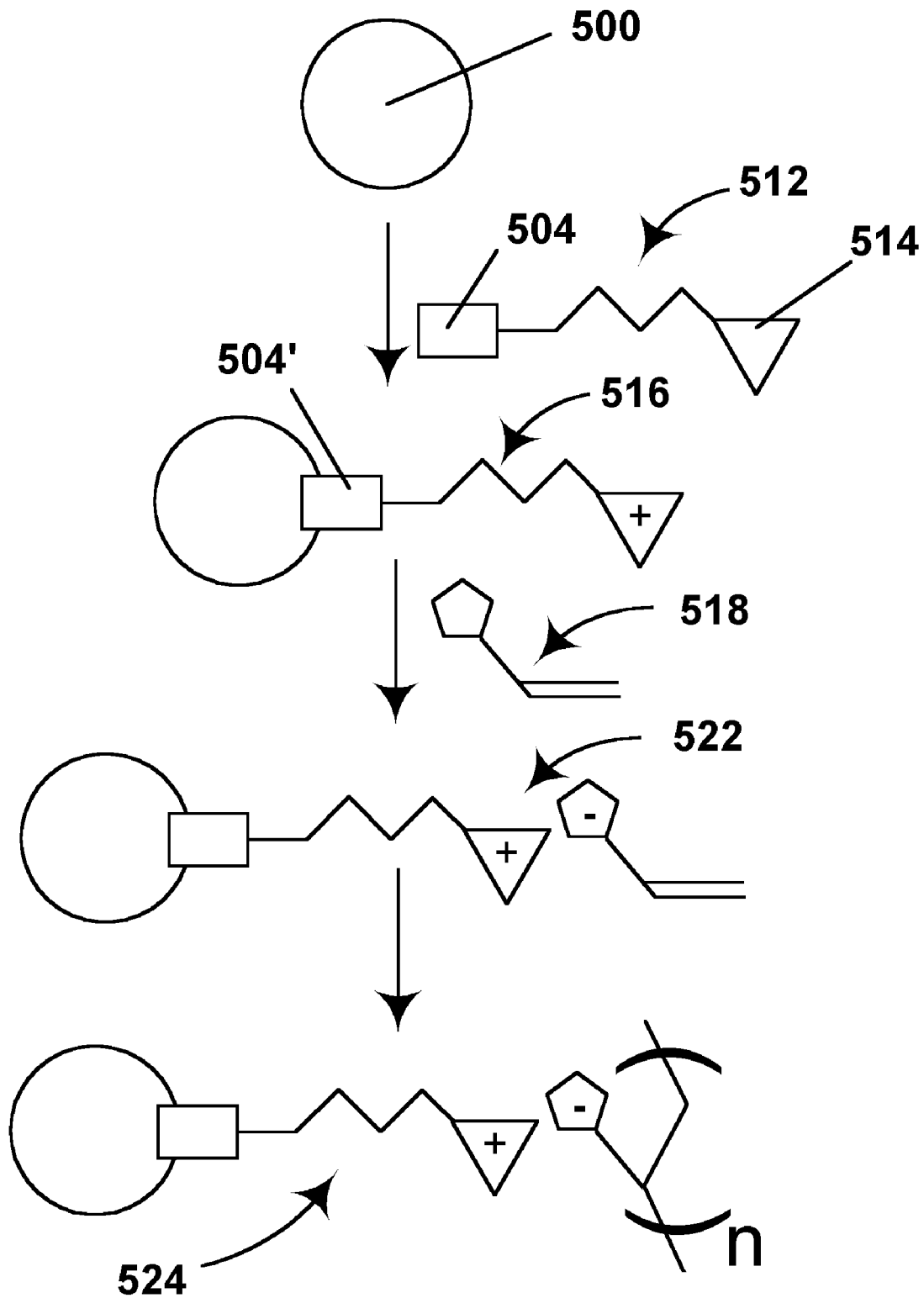

Although, in the first stage of the RGP process, the polymerizable group may be attached to the particle by a covalent bond, in a further variant of the RGP process (which may hereinafter be called "ionic random graft polymerization" or "ionic-RGP"), the polymerizable group is attached to the particle via an ionic bond. Depending upon the chemical nature of the particle, in some cases it may be possible to simply react a monomer with the particle to form the required ionic bond. However, in most cases, it will be necessary to pretreat the particle with a bifunctional reagent (512 in FIG. 5B) having one functional group 504 capable of reacting with, and bonding to, the particle 500 and a second functional group 514 which can form the necessary ionic bond. Thereafter, the resultant particle 516 is reacted with a monomer 518 having a polymerizable group 506 and a third functional group 520 capable of reacting with the second functional group 514 to form the desired ionic bond, as indicated at 522 in FIG. 5B. The final polymerization step of the RGP process (the ethylene needed for the specific reaction shown is omitted from FIG. 5B for ease of illustration) is then carried out as previously described to produce the product indicated at 524 in FIG. 5B. The ionic bond forming reaction is typically an acid-base reaction; for example, the second functional group 514 may be an ammonium group, such as an alkyl-substituted ammonium group, and the third functional group 520 be a sulfonic acid, or vice versa.

The ionic-RGP process has the advantage that some of the ionically-bonded polymer chains in the final particle 524 can detach and become dispersed in the suspending fluid of the electrophoretic medium, thus providing stabilized counterions to the charged electrophoretic particles. In effect, the ionically-bonded polymer functions as both stabilizing polymer and charge control agent for the electrophoretic particles. If, in an opposite charge dual particle display, both types of particles are provided with polymer coatings formed by ionic-RGP processes, the oppositely charged polymer chains which would detach from the surfaces of the two types of particles should associate with, and electrically neutralize, each other in the suspending fluid, thus providing a desirable reduction in the number of ionic species present in, and the background conductivity of, the electrophoretic medium.

Figure 5C:
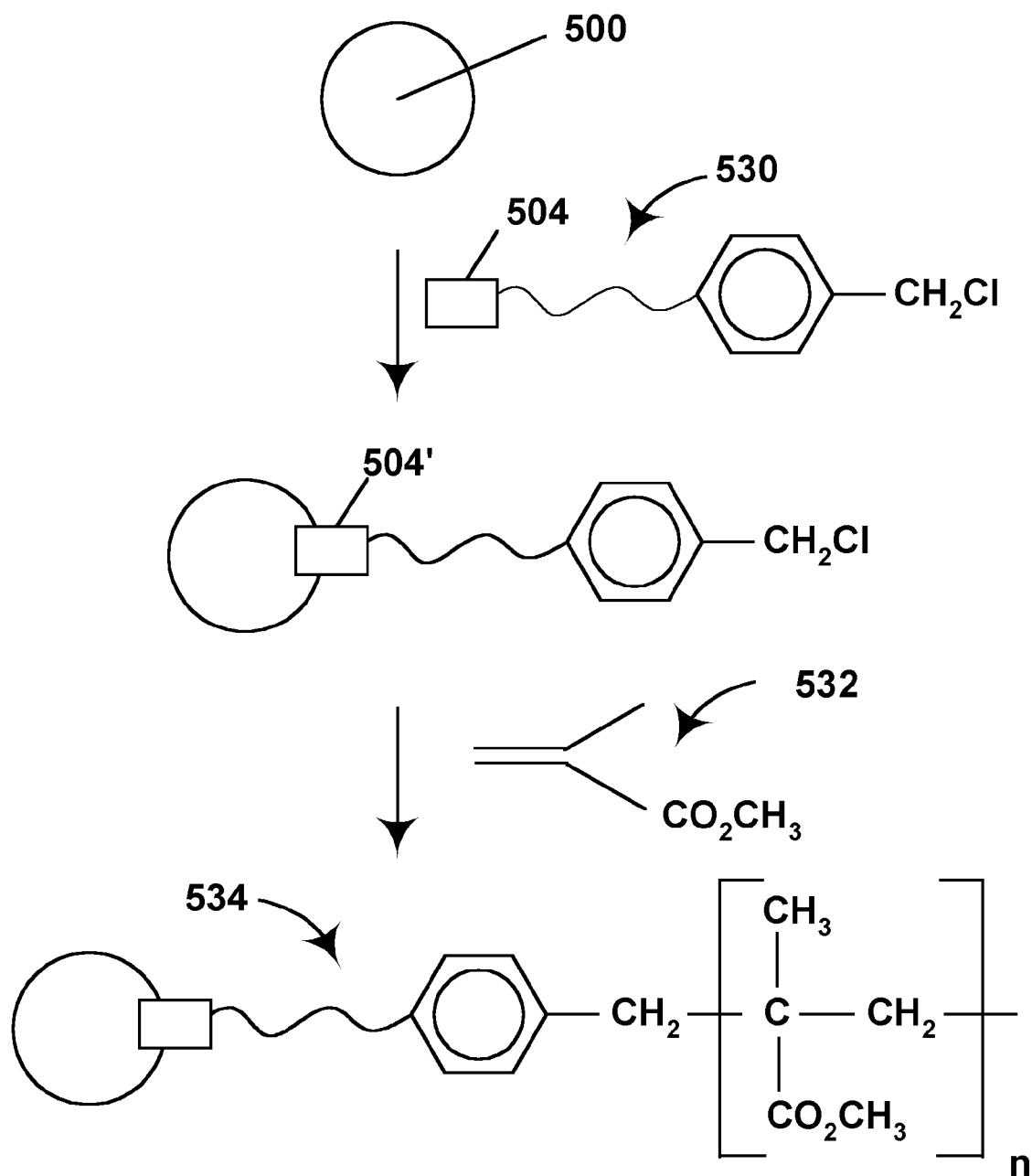

Alternatively, an group capable of initiating polymerization may first be attached to the pigment particle, and a polymer formed from this initiating group. The initiating group may be attached to the polymer surface by a covalent or an ionic bond in any of the ways previously described. For example, a further process of the present invention (which may hereinafter be called the "atom transfer radical polymerization" or "ATRP" process) makes use of atom transfer radical polymerization. In the first stage of this process, as illustrated in FIG. 5C, the surface of a particle 500 is treated with a bifunctional reagent 530 having one group 504 capable of reacting with the particle surface and a second group which provides an initiating site for atom transfer radical polymerization (ATRP). The ATRP initiator site may be, for example, a benzylic chlorine (as indicated in FIG. 5C) or other halogen atom. The resultant particle is then treated with an atom transfer radical polymerizable monomer 532 (methyl methacrylate is shown in FIG. 5C) to form a polymer on the particle surface, as indicated at 534. ATRP has the advantage that the polymerization reaction with a first monomer can be stopped by cooling the reaction mixture, the first monomer replaced by a second monomer, and the reaction thereafter restarted by increasing the temperature of the reaction mixture to cause polymerization of the second monomer on to the ends of the previously-formed polymer of the first monomer. These steps may of course be repeated with a introduction of a third monomer. This process forms on the particle a block copolymer of the two (or more) monomers.

The processes of the present invention are not restricted to the use of ATRP initiating sites on the particle, but include the use of other types of initiating sites, for example ionic or free radical initiating sites. Also, the bifunctional reagents mentioned above need not be single monomeric reagents but can themselves be polymeric. For example, in one process of the invention, a silica/alumina coated titania particle was coated with a terpolymer of styrene, chloromethylstyrene and 3-(trimethoxysilyl)propyl methacrylate by suspending the titania particles in a solution of the terpolymer in tetrahydrofuran (THF) and adding hexane to reduce the solubility of the polymer. After precipitation of the terpolymer, the particles are subjected to conditions effective to cause condensation between the trihydroxysilyl groups on the polymer (the trimethoxysilyl groups having previously been hydrolyzed to this form) and the silanol groups which are always present on silica-coated titania particles, thus covalently binding the polymer to the particle surface. As illustrated in the Examples below, this condensation can be effected under conditions as mild as drying at room temperature for about 24 hours, or heating to 60° C. for 1 to 2 hours. The chloromethylstyrene residues in the bound polymer can then serve as ATRP initiating sites for formation of additional polymer on to the particles.

The processes of the present invention may include more than one stage and/or more than one type of polymerization. For example, in one variant of the process of the present invention (which may hereinafter be called the "RGP-ATRP" process), the particle is first subjected to the RGP process described above, except that a mixture of monomers is used including at least one monomer (for example, a chloromethylstyrene) which contains a group which provides an initiating site for ATRP. Thus, there is formed on the particle a polymer chain which contains ATRP initiating sites. After the RGP polymerization is concluded, the particle is then subjected to ATRP, so that polymer side chains form from the ATRP initiating sites, thus producing a "hyperbranched" polymer having main chains formed by the RGP process and side chains formed by ATRP. It has been found that this type of polymer structure is highly advantageous in stabilizing a suspension of electrophoretic particles in the non-ionic media typically used as suspending fluids in electrophoretic displays. A similar type of hyperbranched polymer could be produced by including in the mixture of monomers used in the RGP step a monomer which contains an initiating group for stable free radical polymerization (SFRP), this SFRP initiating group being chosen so that it essentially does not initiate polymerization under the conditions used in the RGP step. After the RGP step is concluded, the particles is then subjected to SFRP to produce the hyperbranched polymer.

Attachment of Polymerizable Groups and Initiators

In the processes of the present invention, polymerizable groups and initiators may be attached to the surface of the particles using any bifunctional reagents having one group capable of bonding, covalently or ionically, to the surface, and a second group providing the required polymerizable or initiating functionality. The independent functioning of the two groups has the advantage of providing great flexibility in adapting the present invention to any desired type of particle, since it will normally readily be apparent to skilled chemists how to vary (say) the group which bonds to the particle surface in order to adapt the processes to a different type of particle, while keeping the same polymerizable or initiating functionality, so that the later stages of the processes will need few if any changes as a result of changing the type of particle being coated.

In describing the reagents used to provide the desired polymerizable or initiating functionality as "bifunctional", we do not exclude the possibility that the reagents may contain more than one group of each type, and indeed in some cases it may be desirable to provide more than one group of one or both types. For example, polymerization initiators are known (such as 4,4'-azobis(4-cyanovaleric acid)) having more than one ionic site, and such initiators may be used in the present process. Also, as previously noted, the bifunctional reagent may have the form of a polymer containing repeating units having the capacity to bond to the particle surface and other repeated units having the desired polymerizable or initiating functionality, and such polymeric bifunctional reagents will normally contain multiple repeating units of both these types.

The preferred class of functional groups for bonding to titania and similar silica-coated pigments are silane coupling groups, especially trialkoxy silane coupling groups. One especially preferred reagent for attaching a polymerizable group to titania and similar pigments is the aforementioned 3-(trimethoxysilyl)propyl methacrylate, which is available commercially from Dow Chemical Company, Wilmington, Del. under the trade name Z6030. The corresponding acrylate may also be used.

When a titania (or similar silica-coated) particle is to be used in an ionic RGP process, it is preferred that the particle first be treated with a silane coupling agent containing a basic group, preferably a substituted ammonium group, thereby providing amino groups on the particle surface. The resultant amino-functionalized particle is then preferably treated with an acid containing the desired polymerizable group, which thus becomes ionically bound to the particle surface. For example, the aforementioned silica/alumina coated titania R960 may be reacted with the silane coupling agent, N-trimethoxysilylpropyl-N,N,N-trimethylammonium chloride, to obtain a pigment with quaternary ammonium groups covalently attached to its surface. This amino-functionalized pigment may then be dispersed in water with 4-styrene sulfonic acid chloride dihydrate and precipitated to obtain a pigment with styrene functionality ionically associated with the quaternary ammonium groups.

Similarly, when it is desired to attach an initiating group to a coated titania surface, the surface may first be provided with amino functionality in the manner already described, and then a reagent, for example, 4,4'-azobis(4-cyanovaleric acid), containing both an acidic group and an initiating group may be used to ionically bond the initiating group to the particle surface.

The preferred group for bonding to carbon black is a diazonium group; as is well-known to organic chemists, such a group is normally formed in situ by reaction of an aromatic amine with a nitrite. A series of patents and published applications of Cabot Corporation, Boston, Mass. describes the use of diazonium chemistry to attach a wide variety of functional groups to carbon black; see, for example, U.S. Pat. Nos. 5,554,739; 5,672,198; 5,698,016; 5,707,432; 5,713,988; 5,851,280; 5,885,335; 5,895,522; 5,968,243; 6,068,688; and 6,103,380, and International Applications Nos. WO 96/18695; WO 99/51690; WO 00/05312; and WO 00/22051.

The chemistry has also been extended to other pigments; see, for example, U.S. Pat. Nos. 5,837,045; 5,922,118; and 5,958, 999, and International Applications Nos. WO 00/52102 and WO 00/53681. Preferred amines for use with carbon black in the present processes are aniline derivatives, especially para-derivatives of aniline. For example, a preferred reagent for attaching vinyl groups to carbon black is 4-vinylaniline.

Although the reasons for the phenomenon are not entirely understood, it has been observed that the conditions under which the bifunctional reagent is attached to the particle surface may affect the characteristics of the final electrophoretic particles. For example, coated titania particles can be reacted with silane coupling agents under both acidic and basic conditions. However, acidic conditions are preferred, since it has been found that with such conditions for the initial silane coupling reaction, the final polymer-coated titania particles consistently charge negatively with many charge control agents. If, however, basic conditions are used for the initial silane coupling reaction, the final polymer-coated titania particles may charge with both polarities, which is highly undesirable when the particles are to be used in an electrophoretic display.

The polymerizable and initiating groups used in the present processes may be any of those known in the art, provided of course that the relevant groups are compatible with the reactions used to attach them to the particle surface. The present invention extends to processes in which the polymerizable or initiating group is subject to chemical modification, for example by removal of a protecting group, after it has been attached to the particle surface. If, for example, a particular polymerization required the presence of a carboxylic acid group on the particle surface, the bifunctional reagent used might contain this group in esterified form, with the group being de-esterified after it has been attached to the particle surface. (A similar procedure may be employed when preparing a surface for ionic bonding to a polymerizable group in the ionic RGP process of the present invention. For example, a silica/alumina coated titania particle may be treated with a copolymer of 3-(trimethoxysilyl)propyl methacrylate and t-butyl acrylate, thus causing the silyl groups to bond to the particle surface, and leaving the esterified acrylate groups exposed. The particle is then treated with acetic acid to convert the esterified acrylate groups to free acrylic acid groups. Subsequent reaction of the particle with dimethylaminoethyl methacrylate causes an acid/base reaction and ionically bonds the methacrylate groups to the particle, where they serve as polymerizable groups for use in an RGP process.) Similarly, when it is desired to attached a chloroalkyl group to the particle surface to serve as an initiator for ATRP, the bifunctional reagent used might contain the corresponding hydroxyalkyl group, which could be converted to the desired chloroalkyl group by reaction with a chlorinating agent, for example thionyl chloride.

The preferred polymerizable groups for use in the present processes are ethylenically unsaturated groups, especially vinyl, acrylate and methacrylate groups. The preferred initiating groups for ATRP are haloalkyl groups, desirably chloroalkyl groups and most desirably chloromethyl groups. Free radical polymerization initiating groups which may be used include those derived from [10-(t-butyldioxy)decyl]bromide, 2-(carbamoylazo)isobutyronitrile, and 4,4'-azobis(4-cyanovaleric acid).

When choosing the bifunctional reagent to provide polymerizable or initiating functionality on the particle, attention should be paid to the relative positions of the two groups within the reagent. As should be apparent to those skilled in polymer manufacture, the rate of reaction of a polymerizable or initiating group bonded to a particle may vary greatly depending upon whether the group is held rigidly close to the particle surface, or whether the group is spaced (on an atomic scale) from that surface and can thus extend into a reaction medium surrounding the particle, this being a much more favorable environment for chemical reaction of the group. In general, it is preferred that there be at least three atoms in the direct chain between the two functional groups; for example, the aforementioned 3-(trimethoxysilyl)propyl methacrylate provides a chain of four carbon and one oxygen atoms between the silyl and ethylenically unsaturated groups, while the aforementioned 4-vinylaniline separates the amino group (or the diazonium group, in the actual reactive form) from the vinyl group by the full width of a benzene ring, equivalent to about the length of a three-carbon chain.

Polymer Structure and Polymer-forming Processes

Before discussing in detail the preferred processes of the present invention for forming polymers on the electrophoretic particles, it is first appropriate to rehearse the basic reasons why such polymers are advantageous. The fundamental reasons for providing polymer on electrophoretic particles are to increase the stability of the suspension of particles in the suspending fluid, and to stabilize the electrophoretic properties of the particles. For these purposes, it is desirable that the polymer be highly compatible with the suspending medium, and that it assist in stabilizing the charge on the particles as environmental conditions vary.

In practice, the suspending fluid in an electrophoretic medium is normally hydrocarbon-based, although the fluid can include a proportion of halocarbon, which is used to increase of the density of the fluid and thus to decrease the difference between the density of the fluid and that of the particles. Accordingly, it is important that the polymer formed in the present processes be highly compatible with the hydrocarbon suspending fluid, and thus that the polymer itself comprise a major proportion of hydrocarbon chains; except for groups provided for charging purposes, as discussed below, large numbers of strongly ionic groups are undesirable since they render the polymer less soluble in the hydrocarbon suspending fluid and thus adversely affect the stability of the particle dispersion. Also, as already discussed, at least when the medium in which the particles are to be used comprises an aliphatic hydrocarbon suspending fluid (as is commonly the case), it is advantageous for the polymer to have a branched or "brush" structure, with a main chain and a plurality of side chains extending away from the main chain. Each of these side chains should have at least about four, and preferably at least about six, carbon atoms. Substantially longer side chains may be advantageous; for example, some of the preferred polymers illustrated in the Examples below have lauryl ($C_{12}$) side chains. The side chains may themselves be branched; for example, each side chain could be a branched alkyl group, such as a 2-ethylhexyl group. It is believed (although the invention is in no way limited by this belief) that, because of the high affinity of hydrocarbon chains for the hydrocarbon-based suspending fluid, the branches of the polymer spread out from one another in a brush or tree-like structure through a large volume of liquid, thus increasing the affinity of the particle for the suspending fluid and the stability of the particle dispersion.

There are two basic approaches to forming such a brush polymer. The first approach uses monomers which inherently provide the necessary side chains. Typically, such a monomer has a single polymerizable group at one end of a long chain (at least four, and preferably at least six, carbon atoms). Monomers of this type which have been found to give good results in the present processes include hexyl acrylate, 2-ethylhexyl acrylate and lauryl methacrylate. Isobutyl methacrylate and 2,2,3,4,4,4-hexafluorobutyl acrylate have also been used successfully. In some cases, it may be desirable to limit the number of side chains formed in such processes, and this can be achieved by using a mixture of monomers (for example, a mixture of lauryl methacrylate and methyl methacrylate) to form a random copolymer in which only some of the repeating units bear long side chains. In the second approach, typified by the RGP-ATRP process of the invention already described, a first polymerization reaction is carried out using a mixture of monomers, at least one of these monomers bearing an initiating group, thus producing a first polymer containing such initiating groups. The product of this first polymerization reaction is then subjected to a second polymerization, typically under different conditions from the first polymerization, so as to cause the initiating groups within the polymer to cause polymerization of additional monomer on to the original polymer, thereby forming the desired side chains. As with the bifunctional reagents discussed above, we do not exclude the possibility that some chemical modification of the initiating groups may be effected between the two polymerizations. In such a process, the side chains themselves do not need to be heavily branched and can be formed from a small monomer, for example methyl methacrylate.

Despite the unusual nature of the polymerizations used in the present processes, in which one reactant is a "macroscopic" particle (typically of the order of 1 µm or more in diameter) bearing multiple polymerizable or initiating groups rather than a single molecule, the polymerization processes can be carried out using conventional techniques. For example, free radical polymerization of ethylenic or similar radical polymerizable groups attached to particles may be effected using conventional free radical initiators, such as 2,2'-azobis(isobutyrylnitrile) (AIBN), while ATRP polymerization can be effected using the conventional metal complexes, as described in Wang, J. S., et al., *Macromolecules* 1995, 23, 7901, and *J. Am. Chem. Soc.* 1995, 117, 5614, and in Beers, K. et al., *Macromolecules* 1999, 32, 5772-5776. See also U.S. Pat. Nos. 5,763,548; 5,789,487; 5,807,937; 5,945, 491; 5,986,015; 6,069,205; 6,071,980; 6,111,022; 6,121,371; 6,124,411; 6,137,012; 6,153,705; 6,162,882; 6,191,225; and 6,197,883. The entire disclosures of these papers and patents are herein incorporated by reference. The presently preferred catalyst for carrying out ATRP is cuprous chloride in the presence of bipyridyl (Bpy).

RGP processes of the invention in which particles bearing polymerizable groups are reacted with a monomer in the presence of an initiator will inevitably cause some formation of "free" polymer not attached to a particle, as the monomer in the reaction mixture is polymerized. The unattached polymer may be removed by repeated washings of the particles with a solvent (typically a hydrocarbon) in which the unattached polymer is soluble, or (at least in the case of metal oxide or other dense particles) by centrifuging off the treated particles from the reaction mixture (with or without the previous addition of a solvent or diluent), redispersing the particles in fresh solvent, and repeating these steps until the proportion of unattached polymer has been reduced to an acceptable level. (The decline in the proportion of unattached polymer can be followed by thermogravimetric analysis of samples of the polymer.) Empirically, it does not appear that the presence of a small proportion of unattached polymer, of the order of 1 per cent by weight, has any serious deleterious effect on the electrophoretic properties of the treated particles; indeed, in some cases, depending upon the chemical natures of the unattached polymer and the suspending fluid, it may not be necessary to separate the polymer-coated particles from the unattached polymer before using the particles in an electrophoretic display.

As already indicated, it has been found that there is a optimum range for the amount of polymer which should be formed on electrophoretic particles, and that forming an excessive amount of polymer on the particles can degrade their electrophoretic characteristics. The optimum range will vary with a number of factors, including the density and size of the particles being coated, the nature of the suspending medium in which the particles are intended to be used, and the nature of polymer formed on the particles, and for any specific particle, polymer and suspending medium, the optimum range is best determined empirically. However, by way of general guidance, it should be noted that the denser the particle, the lower the optimum proportion of polymer by weight of the particle, and the more finely divided the particle, the higher the optimum proportion of polymer. In general, the particles should be coated with at least about 2, and desirably at least about 4, per cent by weight of polymer. In most cases, the optimum proportion of polymer will range from about 4 to about 15 per cent by weight of the particle, and typically is about 6 to about 15 per cent by weight, and most desirably about 8 to about 12 per cent by weight. More specifically, in the case of titania particles, the presently preferred range of polymer is about 8 to about 12 per cent by weight of the titania.

As regards the optimum proportion of polymer, carbon black tends to be a special case. Carbon black is of low density and (at least in its commercial forms) extremely finely divided, so much so that it is customary to characterize the state of division of the material not by an average particle size but by its capacity to adsorb various gases or liquids under standardized conditions. Thus, the optimum amount of polymer on carbon black may be substantially higher than on most other pigments. Although we generally prefer to provide about 6 to about 14, and desirably about 8 to about 12 weight per cent of polymer on carbon black, under certain circumstances carbon black may be provided with up to about 20, or even about 25 weight per cent of polymer.

It is preferred that the polymers formed on particles by the present processes include charged or chargeable groups, since such groups are useful in controlling the charge on the electrophoretic particles. Hitherto, the charge on electrophoretic particles has normally been controlled by adding to the electrophoretic medium a charge control agent, which is typically a surfactant which absorbs on to the particles and varies the charge thereon. Charge control agents often charge the particles by poorly understood and uncontrolled processes, and can lead to undesirably high conductivity of the electrophoretic medium. Also, since the charge control agent is only physically adsorbed on to the particles and is not bound thereto, changes in conditions may cause partial or complete desorption of the charge control agent from the particles, with consequent undesirable changes in the electrophoretic characteristics of the particles. The desorbed charge control agent might resorb on to other surfaces within the electrophoretic medium, and such resorption has the potential for causing additional problems. The use of charge control agents is especially difficult in dual particle electrophoretic media, where a charge control agent may adsorb on to the surface of one or both types of electrophoretic particles. Indeed, the present inventors have observed cases where the addition of a charge control agent to a dual particle electrophoretic medium, which was intended to be of the type in which the two types of particles bear charges of opposite polarity, resulted in some particles of one type becoming positively charged, and other particles of the same type becoming negatively charged, thus rendering the medium essentially useless for its intended purpose. In the case of an encapsulated dual particle electrophoretic medium, it is also possible for the charge control agent to adsorb on to the capsule wall. Providing charged groups within the bound polymer ensures that these charged groups remain fixed on to the particle, with essentially no tendency to desorb (unless the polymer chains themselves are rendered capable of desorption, as already discussed).

Instead of incorporating charged or chargeable groups within the polymer attached to the pigment particle, or in addition thereto, charged or chargeable groups may be directly attached to the pigment particle without being incorporated into a polymer, although in most cases it will be desirable to provide polymer on the particle's surface in addition to the charged or chargeable groups.

Charged or chargeable groups may be incorporated into the polymer via either the bifunctional agent used to provide polymerizable or initiating functionality to the pigment, or via one or more monomers used to form the polymer chain. For example, if it is desired to provide titania with basic groups which can be protonated to provide positively charged groups on the particle, the aforementioned 3-(trimethoxysilyl)propyl methacrylate bifunctional reagent may be replaced by N-[3-(trimethoxysilyl)propyl]-N'-(4-vinylbenzyl)ethylene diamine, which provides not only a silyl group capable of reacting a silica/alumina coated titania particle and a polymerizable ethylenic group, but also two secondary amino groups which can be protonated to yield a positively charged particle. On the other hand, if the charged or chargeable groups are to provided via monomers, a variety of acrylates and methacrylates are available containing acidic or basic groups, as are a variety of other monomers (for example, 4-vinylpyridine) containing a polymerizable group and a basic or acidic group. As previously mentioned in other contexts, it may be desirable to provide the acidic or basic group in a "blocked" form in the monomer used, and to de-block the group after formation of the polymer. For example, since ATRP cannot be initiated in the presence of acid, if it is desired to provide acidic groups within the polymer, esters such as t-butyl acrylate or isobornyl methacrylate may be used, and the residues of these monomers within the final polymer hydrolyzed to provide acrylic or methacrylic acid residues.

When it is desired to produce charged or chargeable groups on the pigment particles and also polymer separately attached to the particles, it may be very convenient to treat the particles (after any preliminary treatment such as silica coating) with a mixture of two reagents, one of which carries the charged or chargeable group (or a group which will eventually be treated to produce the desired charged or chargeable group), and the other of which carries the polymerizable or polymerization-initiating group. Desirably, the two reagents have the same, or essentially the same, functional group which reacts with the particle surface so that, if minor variations in reaction conditions occur, the relative rates at which the reagents react with the particles will change in a similar manner, and the ratio between the number of charged or chargeable groups and the number of polymerizable or polymerization-initiating groups will remain substantially constant. It will be appreciated that this ratio can be varied and controlled by varying the relative molar amounts of the two (or more) reagents used in the mixture. Examples of reagents which provide chargeable sites but not polymerizable or polymerization-initiating groups include 3-(trimethoxysilyl)propylamine, N-[3-(trimethoxysilyl)propyl]-diethylenetriamine, N-[3-(trimethoxysilyl)propyl]ethylene and 1-[3-(trimethoxysilyl)propyl]urea; all these silane reagents may be purchased from United Chemical Technologies, Inc., Bristol, Pa., 19007. As already mentioned, an example of a reagent which provides polymerizable groups but not charged or chargeable groups is 3-(trimethoxysilyl)propyl methacrylate.

In one preferred embodiment of the present ATRP process, a first ATRP step is conducted using a monomer which ultimately provides acidic, basic or other ionic groups within the final polymer; this monomer may be used alone or in admixture with a monomer which provides neutral residues within the polymer. For example, this first ATRP step might be carried out with 4-vinylpyridine, 2-(dimethylamino)methacrylate or t-butyl methacrylate. Thereafter, a second ATRP step is conducted using a neutral monomer to produce hydrophobic, neutral polymer block which has a high affinity for hydrocarbon suspending fluids and which thus sterically stabilizes the inner charged particle/polymer block. Obviously, similarly double-coated particles can be produced using polymerization techniques other than ATRP.

The polymer-coated particles provided by the present invention may be used with advantage in all of the types of electrophoretic display (namely single particle, opposite charge dual particle, same polarity dual particle and polymer dispersed) previously described. However, the particles of the present invention are especially useful in opposite charge dual particle electrophoretic displays, which are especially difficult to stabilize, since as already mentioned the two types of particles of opposite polarity are inherently attracted towards one another and hence have a strong tendency to form aggregates which may interfere with the electrophoretic operation of the display.

The polymer-coated pigment particles provided by the present invention may also be used in applications other than electrophoretic displays. For example, the increased affinity for hydrocarbon materials provided by the polymer coating on the present pigments should render the pigments advantageous for use in polymeric and rubber matrices, in which the pigments should be more readily dispersible than similar but uncoated pigments. The flexibility in the chemical nature of the polymer coating provided by the processes of the present invention allows the coating to be "tuned" for maximum dispersability in any specific matrix. Thus, the present pigments may be used as easily dispersible pigments or reactive extrusion compounds. Furthermore, the polymer coating on the particles of the present invention should improve the mechanical properties of such pigment/polymer or rubber blends by reducing the tendency for such blends to shear or fracture at the interface between the particles and the matrix material. If the polymer-coated particles are produced by a process which produces the polymer-coated particles in admixture with "free" polymer not attached to the particles (as discussed above), it will, in many cases, not be necessary to separate the coated particles from the free polymer before dispersing the particles in the polymeric or rubber matrix, since the free polymer will disperse harmlessly in the matrix.

Apart from the provision of the polymer on the pigment particles, the electrophoretic media of the present invention may employ the same components and manufacturing techniques as in the aforementioned Massachusetts Institute of Technology and E Ink Corporation patents and applications. The following Sections A-D describe useful materials for use in the various components of the encapsulated electrophoretic displays of the present invention.

A. Suspending Fluid

As already indicated, the suspending fluid containing the particles should be chosen based on properties such as density, refractive index, and solubility. A preferred suspending fluid has a low dielectric constant (about 2), high volume resistivity (about $10^{15}$ ohm-cm), low viscosity (less than 5 centistokes ("cst")), low toxicity and environmental impact, low water solubility (less than 10 parts per million ("ppm")), high specific gravity (greater than 1.5), a high boiling point (greater than 90° C.), and a low refractive index (less than 1.2).

The choice of suspending fluid may be based on concerns of chemical inertness, density matching to the electrophoretic particle, or chemical compatibility with both the electrophoretic particle and bounding capsule (in the case of encapsulated electrophoretic displays). The viscosity of the fluid should be low when movement of the particles is desired. The refractive index of the suspending fluid may also be substantially matched to that of the particles. As used herein, the refractive index of a suspending fluid "is substantially matched" to that of a particle if the difference between their respective refractive indices is between about zero and about 0.3, and is preferably between about 0.05 and about 0.2.

Organic solvents, such as halogenated organic solvents, saturated linear or branched hydrocarbons, silicone oils, and low molecular weight halogen-containing polymers are some useful suspending fluids. The suspending fluid may comprise a single fluid. The fluid will, however, often be a blend of more than one fluid in order to tune its chemical and physical properties. Furthermore, the fluid may contain surface modifiers to modify the surface energy or charge of the electrophoretic particle or bounding capsule. Reactants or solvents for the microencapsulation process (oil soluble monomers, for example) can also be contained in the suspending fluid. Charge control agents can also be added to the suspending fluid.

Useful organic solvents include, but are not limited to, epoxides, such as decane epoxide and dodecane epoxide; vinyl ethers, such as cyclohexyl vinyl ether and Decave (Registered Trade Mark of International Flavors & Fragrances, Inc., New York, N.Y.); and aromatic hydrocarbons, such as toluene and naphthalene. Useful halogenated organic solvents include, but are not limited to, tetrafluorodibromoethylene, tetrachloroethylene, trifluorochloroethylene, 1,2,4-trichlorobenzene and carbon tetrachloride. These materials have high densities. Useful hydrocarbons include, but are not limited to, dodecane, tetradecane, the aliphatic hydrocarbons in the Isopar (Registered Trade Mark) series (Exxon, Houston, Tex.), Norpar (Registered Trade Mark) (a series of normal paraffinic liquids), Shell-Sol (Registered Trade Mark) (Shell, Houston, Tex.), and Sol-Trol (Registered Trade Mark) (Shell), naphtha, and other petroleum solvents. These materials usually have low densities. Useful examples of silicone oils include, but are not limited to, octamethyl cyclosiloxane and higher molecular weight cyclic siloxanes, poly(methyl phenyl siloxane), hexamethyldisiloxane, and polydimethylsiloxane. These materials usually have low densities. Useful low molecular weight halogen-containing polymers include, but are not limited to, poly(chlorotrifluoroethylene) polymer (Halogenated Hydrocarbon Inc., River Edge, N.J.), Galden (Registered Trade Mark) (a perfluorinated ether from Ausimont, Morristown, N.J.), or Krytox (Registered Trade Mark) from du Pont (Wilmington, Del.). In a preferred embodiment, the suspending fluid is a poly(chlorotrifluoroethylene) polymer. In a particularly preferred embodiment, this polymer has a degree of polymerization from about 2 to about 10. Many of the above materials are available in a range of viscosities, densities, and boiling points.

The fluid must be capable of being formed into small droplets prior to a capsule being formed. Processes for forming small droplets include flow-through jets, membranes, nozzles, or orifices, as well as shear-based emulsifying schemes. The formation of small drops may be assisted by electrical or sonic fields. Surfactants and polymers can be used to aid in the stabilization and emulsification of the droplets in the case of an emulsion type encapsulation. One surfactant for use in displays of the invention is sodium dodecylsulfate.

It can be advantageous in some displays for the suspending fluid to contain an optically absorbing dye. This dye must be soluble in the fluid, but will generally be insoluble in the other components of the capsule. There is much flexibility in the choice of dye material. The dye can be a pure compound, or blends of dyes to achieve a particular color, including black. The dyes can be fluorescent, which would produce a display in which the fluorescence properties depend on the position of the particles. The dyes can be photoactive, changing to another color or becoming colorless upon irradiation with either visible or ultraviolet light, providing another means for obtaining an optical response. Dyes could also be polymerizable by, for example, thermal, photochemical or chemical diffusion processes, forming a solid absorbing polymer inside the bounding shell.

There are many dyes that can be used in encapsulated electrophoretic displays. Properties important here include light fastness, solubility in the suspending liquid, color, and cost. These dyes are generally chosen from the classes of azo, anthraquinone, and triphenylmethane type dyes and may be chemically modified so as to increase their solubility in the oil phase and reduce their adsorption by the particle surface.

A number of dyes already known to those skilled in the art of electrophoretic displays will prove useful. Useful azo dyes include, but are not limited to: the Oil Red dyes, and the Sudan Red and Sudan Black series of dyes. Useful anthraquinone dyes include, but are not limited to: the Oil Blue dyes, and the Macrolex Blue series of dyes. Useful triphenylmethane dyes include, but are not limited to, Michler's hydrol, Malachite Green, Crystal Violet, and Auramine O.

B. Charge Control Agents and Particle Stabilizers

Charge control agents may be used, with or without charged groups in polymer coatings, to provide good electrophoretic mobility to the electrophoretic particles. Stabilizers may be used to prevent agglomeration of the electrophoretic particles, as well as prevent the electrophoretic particles from irreversibly depositing onto the capsule wall. Either component can be constructed from materials across a wide range of molecular weights (low molecular weight, oligomeric, or polymeric), and may be a single pure compound or a mixture. The charge control agent used to modify and/or stabilize the particle surface charge is applied as generally known in the arts of liquid toners, electrophoretic displays, non-aqueous paint dispersions, and engine-oil additives. In all of these arts, charging species may be added to non-aqueous media in order to increase electrophoretic mobility or increase electrostatic stabilization. The materials can improve steric stabilization as well. Different theories of charging are postulated, including selective ion adsorption, proton transfer, and contact electrification.

An optional charge control agent or charge director may be used. These constituents typically consist of low molecular weight surfactants, polymeric agents, or blends of one or more components and serve to stabilize or otherwise modify the sign and/or magnitude of the charge on the electrophoretic particles. Additional pigment properties which may be relevant are the particle size distribution, the chemical composition, and the lightfastness.

Charge adjuvants may also be added. These materials increase the effectiveness of the charge control agents or charge directors. The charge adjuvant may be a polyhydroxy compound or an aminoalcohol compound, and is preferably soluble in the suspending fluid in an amount of at least 2% by weight. Examples of polyhydroxy compounds which contain at least two hydroxyl groups include, but are not limited to, ethylene glycol, 2,4,7,9-tetramethyldecyne-4,7-diol, poly(propylene glycol), pentaethylene glycol, tripropylene glycol, triethylene glycol, glycerol, pentaerythritol, glycerol tris (12-hydroxystearate), propylene glycerol monohydroxystearate, and ethylene glycol monohydroxystearate. Examples of aminoalcohol compounds which contain at least one alcohol function and one amine function in the same molecule include, but are not limited to, triisopropanolamine, triethanolamine, ethanolamine, 3-amino-1-propanol, o-aminophenol, 5-amino-1-pentanol, and tetrakis(2-hydroxyethyl)-ethylenediamine. The charge adjuvant is preferably present in the suspending fluid in an amount of about 1 to about 100 milligrams per gram ("mg/g") of the particle mass, and more preferably about 50 to about 200 mg/g.

In general, it is believed that charging results as an acid-base reaction between some moiety present in the continuous phase and the particle surface. Thus useful materials are those which are capable of participating in such a reaction, or any other charging reaction as known in the art.

Different non-limiting classes of charge control agents which are useful include organic sulfates or sulfonates, metal soaps, block or comb copolymers, organic amides, organic zwitterions, and organic phosphates and phosphonates. Useful organic sulfates and sulfonates include, but are not limited to, sodium bis(2-ethylhexyl)sulfosuccinate, calcium dodecylbenzenesulfonate, calcium petroleum sulfonate, neutral or basic barium dinonylnaphthalene sulfonate, neutral or basic calcium dinonylnaphthalene sulfonate, dodecylbenzenesulfonic acid sodium salt, and ammonium lauryl sulfate. Useful metal soaps include, but are not limited to, basic or neutral barium petronate, calcium petronate, Co—, Ca—, Cu—, Mn—, Ni—, Zn—, and Fe— salts of naphthenic acid, Ba—, Al—, Zn—, Cu—, Pb—, and Fe— salts of stearic acid, divalent and trivalent metal carboxylates, such as aluminum tristearate, aluminum octanoate, lithium heptanoate, iron stearate, iron distearate, barium stearate, chromium stearate, magnesium octanoate, calcium stearate, iron naphthenate, zinc naphthenate, Mn— and Zn— heptanoate, and Ba—, Al—, Co—, Mn—, and Zn— octanoate. Useful block or comb copolymers include, but are not limited to, AB diblock copolymers of (A) polymers of 2-(N,N-dimethylamino)ethyl methacrylate quaternized with methyl p-toluenesulfonate and (B) poly(2-ethylhexyl methacrylate), and comb graft copolymers with oil soluble tails of poly(12-hydroxystearic acid) and having a molecular weight of about 1800, pendant on an oil-soluble anchor group of poly(methyl methacrylate-methacrylic acid). Useful organic amides include, but are not limited to, polyisobutylene succinimides such as OLOA 371 or 1200 (available from Chevron Oronite Company LLC, Houston, Tex.), or Solsperse 17000 (available from Avecia Ltd., Blackley, Manchester, United Kingdom; "Solsperse" is a Registered Trade Mark), and N-vinylpyrrolidone polymers. Useful organic zwitterions include, but are not limited to, lecithin. Useful organic phosphates and phosphonates include, but are not limited to, the sodium salts of phosphated mono- and di-glycerides with saturated and unsaturated acid substituents.

Particle dispersion stabilizers may be added to prevent particle flocculation or attachment to the capsule walls. For the typical high resistivity liquids used as suspending fluids in electrophoretic displays, non-aqueous surfactants may be used. These include, but are not limited to, glycol ethers, acetylenic glycols, alkanolamides, sorbitol derivatives, alkyl amines, quaternary amines, imidazolines, dialkyl oxides, and sulfosuccinates.

If a bistable electrophoretic medium is desired, it may be desirable to include in the suspending fluid a polymer having a number average molecular weight in excess of about 20,000, this polymer being essentially non-absorbing on the electrophoretic particles; poly(isobutylene) is a preferred polymer for this purpose. See application Ser. No. 10/063,236 filed Apr. 2, 2002 (Publication No. 2002/0180687; the entire disclosure of this copending application is herein incorporated by reference) and the corresponding International Application No. PCT/US02/10267 (Publication No. WO 02/079869).

C. Encapsulation

Encapsulation of the internal phase may be accomplished in a number of different ways. Numerous suitable procedures for microencapsulation are detailed in both Microencapsulation, Processes and Applications, (I. E. Vandegaer, ed.), Plenum Press, New York, N.Y. (1974) and Gutcho, Microcapsules and Microencapsulation Techniques, Noyes Data Corp., Park Ridge, N.J. (1976). The processes fall into several general categories, all of which can be applied to the present invention: interfacial polymerization, in situ polymerization, physical processes, such as coextrusion and other phase separation processes, in-liquid curing, and simple/complex coacervation.

Numerous materials and processes should prove useful in formulating displays of the present invention. Useful materials for simple coacervation processes to form the capsule include, but are not limited to, gelatin, poly(vinyl alcohol), poly(vinyl acetate), and cellulosic derivatives, such as, for example, carboxymethylcellulose. Useful materials for complex coacervation processes include, but are not limited to, gelatin, acacia, carageenan, carboxymethylcellulose, hydrolyzed styrene anhydride copolymers, agar, alginate, casein, albumin, methyl vinyl ether co-maleic anhydride, and cellulose phthalate. Useful materials for phase separation processes include, but are not limited to, polystyrene, poly(methyl methacrylate) (PMMA), poly(ethyl methacrylate), poly (butyl methacrylate), ethyl cellulose, poly(vinylpyridine), and polyacrylonitrile. Useful materials for in situ polymerization processes include, but are not limited to, polyhydroxyamides, with aldehydes, melamine, or urea and formaldehyde; water-soluble oligomers of the condensate of melamine, or urea and formaldehyde; and vinyl monomers, such as, for example, styrene, methyl methacrylate (MMA) and acrylonitrile. Finally, useful materials for interfacial polymerization processes include, but are not limited to, diacyl chlorides, such as, for example, sebacoyl, adipoyl, and di- or poly-amines or alcohols, and isocyanates. Useful emulsion polymerization materials may include, but are not limited to, styrene, vinyl acetate, acrylic acid, butyl acrylate, t-butyl acrylate, methyl methacrylate, and butyl methacrylate.

Capsules produced may be dispersed into a curable carrier, resulting in an ink which may be printed or coated on large and arbitrarily shaped or curved surfaces using conventional printing and coating techniques.

In the context of the present invention, one skilled in the art will select an encapsulation procedure and wall material based on the desired capsule properties. These properties include the distribution of capsule radii; electrical, mechanical, diffusion, and optical properties of the capsule wall; and chemical compatibility with the internal phase of the capsule.

The capsule wall generally has a high electrical resistivity. Although it is possible to use walls with relatively low resistivities, this may limit performance in requiring relatively higher addressing voltages. The capsule wall should also be mechanically strong (although if the finished capsule powder is to be dispersed in a curable polymeric binder for coating, mechanical strength is not as critical). The capsule wall should generally not be porous. If, however, it is desired to use an encapsulation procedure that produces porous capsules, these can be overcoated in a post-processing step (i.e., a second encapsulation). Moreover, if the capsules are to be dispersed in a curable binder, the binder will serve to close the pores. The capsule walls should be optically clear. The wall material may, however, be chosen to match the refractive index of the internal phase of the capsule (i.e., the suspending fluid) or a binder in which the capsules are to be dispersed. For some applications (e.g., interposition between two fixed electrodes), monodispersed capsule radii are desirable.

An encapsulation technique that is suited to the present invention involves a polymerization between urea and formaldehyde in an aqueous phase of an oil/water emulsion in the presence of a negatively charged, carboxyl-substituted, linear hydrocarbon polyelectrolyte material. The resulting capsule wall is a urea/formaldehyde copolymer, which discretely encloses the internal phase. The capsule is clear, mechanically strong, and has good resistivity properties.

The related technique of in situ polymerization utilizes an oil/water emulsion, which is formed by dispersing the electrophoretic fluid (i.e., the dielectric liquid containing a suspension of the pigment particles) in an aqueous environment. The monomers polymerize to form a polymer with higher affinity for the internal phase than for the aqueous phase, thus condensing around the emulsified oily droplets. In one in situ polymerization process, urea and formaldehyde condense in the presence of poly(acrylic acid) (see, e.g., U.S. Pat. No. 4,001,140). In other processes, described in U.S. Pat. No. 4,273,672, any of a variety of cross-linking agents borne in aqueous solution is deposited around microscopic oil droplets. Such cross-linking agents include aldehydes, especially formaldehyde, glyoxal, or glutaraldehyde; alum; zirconium salts; and polyisocyanates.

The coacervation approach also utilizes an oil/water emulsion. One or more colloids are coacervated (i.e., agglomerated) out of the aqueous phase and deposited as shells around the oily droplets through control of temperature, pH and/or relative concentrations, thereby creating the microcapsule. Materials suitable for coacervation include gelatins and gum arabic. See, e.g., U.S. Pat. No. 2,800,457.

The interfacial polymerization approach relies on the presence of an oil-soluble monomer in the electrophoretic composition, which once again is present as an emulsion in an aqueous phase. The monomers in the minute hydrophobic droplets react with a monomer introduced into the aqueous phase, polymerizing at the interface between the droplets and the surrounding aqueous medium and forming shells around the droplets. Although the resulting walls are relatively thin and may be permeable, this process does not require the elevated temperatures characteristic of some other processes, and therefore affords greater flexibility in terms of choosing the dielectric liquid.

Coating aids can be used to improve the uniformity and quality of the coated or printed electrophoretic ink material. Wetting agents are typically added to adjust the interfacial tension at the coating/substrate interface and to adjust the liquid/air surface tension. Wetting agents include, but are not limited to, anionic and cationic surfactants, and nonionic species, such as silicone or fluoropolymer-based materials.

Dispersing agents may be used to modify the interfacial tension between the capsules and binder, providing control over flocculation and particle settling.

Surface tension modifiers can be added to adjust the air/ink interfacial tension. Polysiloxanes are typically used in such an application to improve surface leveling while minimizing other defects within the coating. Surface tension modifiers include, but are not limited to, fluorinated surfactants, such as, for example, the Zonyl (Registered Trade Mark) series from du Pont, the Fluorad (Registered Trade Mark) series from 3M (St. Paul, Minn.), and the fluoroalkyl series from Autochem (Glen Rock, N.J.); siloxanes, such as, for example, Silwet (Registered Trade Mark) from Union Carbide (Danbury, Conn.); and polyethoxy and polypropoxy alcohols. Antifoams, such as silicone and silicone-free polymeric materials, may be added to enhance the movement of air from within the ink to the surface and to facilitate the rupture of bubbles at the coating surface. Other useful antifoams include, but are not limited to, glyceryl esters, polyhydric alcohols, compounded antifoams, such as oil solutions of alkylbenzenes, natural fats, fatty acids, and metallic soaps, and silicone antifoaming agents made from the combination of dimethyl siloxane polymers and silica. Stabilizers such as UV-absorbers and antioxidants may also be added to improve the lifetime of the ink.

D. Binder Material

The binder typically is used as an adhesive medium that supports and protects the capsules, as well as binds the electrode materials to the capsule dispersion. A binder can be non-conducting, semiconductive, or conductive. Binders are available in many forms and chemical types. Among these are water-soluble polymers, water-borne polymers, oil-soluble polymers, thermoset and thermoplastic polymers, and radiation-cured polymers.

Among the water-soluble polymers are the various polysaccharides, the polyvinyl alcohols, N-methylpyrrolidone, N-vinylpyrrolidone, the various Carbowax (Registered Trade Mark) species (Union Carbide, Danbury, Conn.), and poly(2-hydroxyethyl acrylate).

The water-dispersed or water-borne systems are generally latex compositions, typified by the Neorez (Registered Trade Mark) and Neocryl (Registered Trade Mark) resins (Zeneca Resins, Wilmington, Mass.), Acrysol (Registered Trade Mark) (Rohm and Haas, Philadelphia, Pa.), Bayhydrol (Registered Trade Mark) (Bayer, Pittsburgh, Pa.), and the Cytec Industries (West Paterson, N.J.) HP line. These are generally latices of polyurethanes, occasionally compounded with one or more of the acrylics, polyesters, polycarbonates or silicones, each lending the final cured resin in a specific set of properties defined by glass transition temperature, degree of "tack," softness, clarity, flexibility, water permeability and solvent resistance, elongation modulus and tensile strength, thermoplastic flow, and solids level. Some water-borne systems can be mixed with reactive monomers and catalyzed to form more complex resins. Some can be further cross-linked by the use of a cross-linking reagent, such as an aziridine, for example, which reacts with carboxyl groups.

A typical application of a water-borne resin and aqueous capsules follows. A volume of particles is centrifuged at low speed to separate excess water. After a given centrifugation process, for example 10 minutes at 60×gravity ("g"), the capsules are found at the bottom of the centrifuge tube, while the water is at the top. The water is carefully removed (by decanting or pipetting). The mass of the remaining capsules is measured, and a mass of resin is added such that the mass of resin is, for example, between one eighth and one tenth of the weight of the capsules. This mixture is gently mixed on an oscillating mixer for approximately one half hour. After about one half hour, the mixture is ready to be coated onto the appropriate substrate.

The thermoset systems are exemplified by the family of epoxies. These binary systems can vary greatly in viscosity, and the reactivity of the pair determines the "pot life" of the mixture. If the pot life is long enough to allow a coating operation, capsules may be coated in an ordered arrangement in a coating process prior to the resin curing and hardening.

Thermoplastic polymers, which are often polyesters, are molten at high temperatures. A typical application of this type of product is hot-melt glue. A dispersion of heat-resistant capsules could be coated in such a medium. The solidification process begins during cooling, and the final hardness, clarity and flexibility are affected by the branching and molecular weight of the polymer.

Oil or solvent-soluble polymers are often similar in composition to the water-borne system, with the obvious exception of the water itself. The latitude in formulation for solvent systems is enormous, limited only by solvent choices and polymer solubility. Of considerable concern in solvent-based systems is the viability of the capsule itself, the integrity of the capsule wall cannot be compromised in any way by the solvent.

Radiation cure resins are generally found among the solvent-based systems. Capsules may be dispersed in such a medium and coated, and the resin may then be cured by a timed exposure to a threshold level of ultraviolet radiation, either long or short wavelength. As in all cases of curing polymer resins, final properties are determined by the branching and molecular weights of the monomers, oligomers and cross-linkers.

A number of "water-reducible" monomers and oligomers are, however, marketed. In the strictest sense, they are not water soluble, but water is an acceptable diluent at low concentrations and can be dispersed relatively easily in the mixture. Under these circumstances, water is used to reduce the viscosity (initially from thousands to hundreds of thousands centipoise). Water-based capsules, such as those made from a protein or polysaccharide material, for example, could be dispersed in such a medium and coated, provided the viscosity could be sufficiently lowered. Curing in such systems is generally by ultraviolet radiation.

Like other encapsulated electrophoretic displays, the encapsulated electrophoretic displays of the present invention provide flexible, reflective displays that can be manufactured easily and consume little power (or no power in the case of bistable displays in certain states). Such displays, therefore, can be incorporated into a variety of applications and can take on many forms. Once the electric field is removed, the electrophoretic particles can be generally stable. Additionally, providing a subsequent electric charge can alter a prior configuration of particles. Such displays may include, for example, a plurality of anisotropic particles and a plurality of second particles in a suspending fluid. Application of a first electric field may cause the anisotropic particles to assume a specific orientation and present an optical property. Application of a second electric field may then cause the plurality of second particles to translate, thereby disorienting the anisotropic particles and disturbing the optical property. Alternatively, the orientation of the anisotropic particles may allow easier translation of the plurality of second particles. Alternatively or in addition, the particles may have a refractive index that substantially matches the refractive index of the suspending fluid.

An encapsulated electrophoretic display may take many forms. The capsules of such a display may be of any size or shape. The capsules may, for example, be spherical and may have diameters in the millimeter range or the micron range, but are preferably from about ten to about a few hundred microns. The particles within the capsules of such a display may be colored, luminescent, light-absorbing or transparent, for example.

The following Examples are now given, though by way of illustration only, to show details of particularly preferred reagents, conditions and techniques used in the electrophoretic media and displays of the present invention. All centrifuging mentioned was carried out on a Beckman GS-6 or Allegra 6 centrifuge (available from Beckman Coulter, Inc., Fullerton, Calif. 92834).

EXAMPLE 1

This Example illustrates the provision of a silica coating on various types of pigment particles. The procedure used is adapted from U.S. Pat. No. 3,639,133.

Ferric oxide ($Fe_2O_3$, 50 g) was placed in a sodium silicate solution (430 ml of a 0.073M solution with 1.9% sodium hydroxide), and the resultant mixture was rapidly stirred and then sonicated at 30-35° C. The suspension was then heated to 90-95° C. over a period of 1 hour and sulfuric acid (150 ml of a 0.22 M solution) and additional sodium silicate (75 ml of a 0.83 M solution with 0.2% sodium hydroxide) were added simultaneously over a period of 2.5 to 3 hours, with stirring. After these additions had been completed, the reaction mixture was stirred for an additional 15 minutes, then cooled to room temperature, added to plastic bottles and centrifuged at 3500 rpm for 15 minutes. The supernatant liquor was decanted, and the silica-coated pigment re-dispersed in deionized water and centrifuged at 3500 rpm for 15 minutes. The washing was repeated twice more, and the pigment finally dried in an oven at 85° C. for 2 hours.

EXAMPLE 2

This Example illustrates reaction of the silica-coated pigment prepared in Example 1 with a bifunctional reagent in the first stage of an RGP process of the present invention.

To a mixture of ethanol (500 ml) and water (50 mL), concentrated ammonium hydroxide was added until the pH reached 9.0-9.5, N-[3-(trimethoxysilyl)propyl]-N'-(4-vinylbenzyl)ethylene diamine hydrochloride (40 g of a 40 weight per cent solution in methanol) was added, and the resultant solution was stirred rapidly for 4 minutes. The silica-coated ferric oxide (25 g) prepared in Example 1 was then added, and the mixture stirred rapidly for 7 minutes. The resultant suspension was poured into plastic bottles and centrifuged at 3500 rpm for 30 minutes. The supernatant liquor was decanted, and the silanized pigment re-dispersed in ethanol and centrifuged at 3500 rpm for 30 minutes, and the liquid decanted. The washing was repeated, and the pigment finally dried in air for 18 hours, then under vacuum at 70° C. for 2 hours.

The procedures described in Examples 1 and 2 have been repeated successfully with chromic oxide ($Cr_2O_3$), cobalt aluminate ($CoAl_2O_4$), cobalt chromate ($CoCr_2O_4$), copper chromate ($CuCr_2O_4$), zinc ferrate ($ZnFe_2O_4$), nickel aluminate ($NiAl_2O_4$), zinc aluminate ($ZnAl_2O_4$), lead chromate ($PbCr_2O_4$), cobalt titanate $Co_2TiO_4$), antimony dioxide ($SbO_2$), nickel dioxide ($NiO_2$) and molybdenum (II) oxide (MoO).

EXAMPLE 3

This Example illustrates conversion of the silanized pigment produced in Example 2 to a polymer-coated pigment useful in an electrophoretic display.

The silanized pigment produced in Example 2 (50 g) was placed in a round-bottomed flask with toluene (50 g) and 2-ethylhexyl methacrylate monomer (50 g). The resultant mixture was stirred rapidly under a nitrogen atmosphere (argon may alternatively be used) for 20 minutes, then slowly heated to 50° C. and AIBN (0.5 g in 10 ml of toluene) added quickly. The suspension was then heated to 65° C. and stirred at this temperature under nitrogen for a further 18 hours. The resultant viscous suspension was poured into plastic bottles, the flask being washed out with ethyl acetate to remove residual product and the ethyl acetate solution added to the bottles. The bottles were centrifuged at 3500 rpm for 30 minutes. The supernatant liquor was decanted, and the polymer-coated pigment re-dispersed in ethyl acetate and centrifuged at 3500 rpm for 30 minutes, and the liquid decanted. The washing was repeated, and the pigment dried in air until a workable powder was obtained, and then under vacuum at 65° C. for 6 to 18 hours.

EXAMPLE 4

This Example illustrates an ATRP process of the present invention in which an ATRP initiating group is bonded to a pigment using a polymeric bifunctional reagent.

A terpolymer was prepared by adding styrene (80 g), p-chloromethylstyrene (15 g), trimethoxysilyl methacrylate (23 g), AIBN (6.3 g) and toluene (94 g) to a round-bottomed flask, which was then purged with nitrogen for approximately 45 minutes. The flask was heated to 60° C. and maintained at this temperature for about 18 hours. Thermogravimetric analysis indicated that the resultant solution contained about 40 per cent by weight polymer.

An aliquot (12 g, equal to approximately 4.8 g of terpolymer) as added to THF (100 ml), and then silica-coated titania (20 g of du Pont R960) was added to the solution, and the mixture was sonicated for 5 minutes, and then stirred vigorously. Hexane (500 ml) was added, and the stirring was stopped, whereupon the titania immediately settled out. The mixture was then centrifuged at 5000 rpm for 5 minutes, the liquid decanted and the treated pigment left to stand overnight at room temperature to dry and cure (i.e., for the reaction between the silyl groups of the polymer and the silica surface of the pigment to be completed). Thermogravimetric analysis indicated that about 3 weight per cent of polymer had become attached to the pigment.

The polymer-treated pigment thus produced was subjected to ATRP in the following manner. An aliquot (5.0 g, equivalent to 0.09 mmole of chloromethylstyrene, the ATRP initiator) of the pigment, cuprous chloride (11 mg, 11 mmole), bipyridyl (45 mg, 0.29 mmole), and methyl methacrylate (10 ml, 94 mmole) were placed in a flask and purged with nitrogen for 30 minutes. The flask was then placed on a bath at 120-130° C. for approximately 4 hours. Additional methyl methacrylate (5 ml) was added, the flask purged with nitrogen for 15 minutes, and the flask was returned to the bath for an additional 2 hours at 120-130° C., and finally allowed to cool. Methanol (400 ml) was added to precipitate the polymer-coated pigment, the liquid was decanted and the pigment washed once with methanol (200 ml) and twice with dichloromethane (200 ml each time) and dried at room temperature overnight. Thermogravimetric analysis indicated that the final polymer contained approximately 13.1 per cent by weight of polymer, so that the ATRP added approximately 10.1 per cent by weight of polymer to the terpolymer-treated pigment.

EXAMPLE 5

This Example illustrates an RGP process of the present invention starting from carbon black.

Part A: Preparation of Black Pigment having Radical Grafting Groups Attached to the Particle Surface.

Carbon black (Printex A, 140 g) was dispersed in water (3 L) with magnetic stirring, then hydrochloric acid (6 mL of 37% by weight) and 4-vinylaniline (3.0 g, 25 mmole) were added, and the resultant mixture was heated to 40° C. Separately, sodium nitrite (1.74 g, 25 mmole) was dissolved in water (10 ml). This nitrite solution was then added slowly to the carbon black-containing reaction mixture over a 10 minute period, and the reaction mixture was stirred for a further 16 hours. The resultant product was centrifuged and the solids produced rinsed with acetone (200 ml). This rinsing was repeated and the solids dried under vacuum for 12 hours to produce 141 g of the desired product. Thermogravimetric analysis of this product showed a 1.4 per cent weight loss.

Part B : Preparation of the Polymer-coated Black Pigment.

To a reaction flask fitted with a nitrogen purge apparatus, magnetic stir bar and reflux column were added the product of Part A above (20 g), toluene (40 ml), 2-ethylhexyl acrylate (40 ml) and AIBN (0.26 g). The flask was purged with nitrogen for 20 minutes with stirring, then immersed into a room temperature oil bath, gradually heated to 70° C., with continuous stirring, and maintained at this temperature for 20 hours. The reaction mixture was then allowed to cool, diluted with an equal volume of acetone, and centrifuged. The supernatant liquor was decanted, and the solids redispersed in THF (ethyl acetate may alternatively be used) and rinsed; this process was repeated until thermogravimetric analysis consistently indicated a weight less of 8.9 per cent. Approximately 20 g of the final product was isolated.

EXAMPLE 6

This Example illustrates an RGP process of the present invention starting from titania.

Part A : Preparation of White Pigment having Radical Grafting Groups Attached to the Particle Surface.

To a 95:5 v/v ethanol water mixture (2 L) was added 3-(trimethoxysilyl)methacrylate (Dow Z6030, 20 ml), and the pH of the solution was immediately adjusted to 4.5 by addition of acetic acid. The resultant solution was stirred for 5 minutes, then silica-coated titania (100 g of du Pont R960) was added and the mixture stirred for a further 10-20 minutes, the solids were allowed to settle, and the supernatant liquor was decanted. The resultant solids were washed twice with acetone (2×200 ml aliquots) and dried overnight at room temperature.

Part B : Preparation of the Polymer-Coated White Pigment.

To a reaction flask fitted with a nitrogen purge apparatus, magnetic stir bar and reflux column were added the product of Part A above (40 g), toluene (50 ml), 2-ethylhexyl acrylate (45 ml) and AIBN (0.3 g). The flask was purged with nitrogen for 20 minutes, with stirring, then immersed into a room temperature oil bath, gradually heated to 70° C., with continuous stirring, and maintained at this temperature for 20 hours. The reaction mixture was then allowed to cool, diluted with an equal volume of acetone, and centrifuged. The supernatant liquor was decanted, and the solids redispersed in acetone or THF and rinsed; this process was repeated until thermogravimetric analysis indicated a consistent weight loss in the range of 4.5 to 10 per cent. Approximately 40 g of the final product was isolated.

A similar polymer-coated titania was prepared substituting an equimolar amount of 2-ethylhexyl methacrylate in place of the corresponding acrylate monomer.

EXAMPLE 7

This Example illustrates the construction of an encapsulated dual-particle electrophoretic display using the polymer-coated pigments prepared in Examples 5 and 6 above. The suspending fluid used is a mixture of a 1:1 w/w mixture of a hydrocarbon (Isopar-G, available commercially from Exxon Corporation, Houston, Tex.; "Isopar" is a Registered Trade Mark) and a halogenated hydrocarbon oil (Halogenated hydrocarbon oil 1.8, available commercially from Halogenated Hydrocarbon Products Corporation, River Edge, N.J. referred to hereinafter for simplicity as "Halocarbon"); this mixture is hereinafter referred to as "1:1 Isopar/Halocarbon mixture". This suspending fluid also contains, as a charge control agent, Emphos (Registered Trade Mark) D-70-30C (a phosphated mono/diglyceride surface active agent sold by Witco Chemical Company, Greenwich, Conn.).

Part A: Preparation of Internal Phase

Into a 125 ml polypropylene bottle were placed 4.0 g of the 2-ethylmethacrylate coated titania prepared in Example 6 above, 0.24 g of a 10 per cent by weight solution of Emphos D-70-30C in Isopar, and 47.80 g of 1:1 Isopar/Halocarbon mixture. The resultant mixture was sonicated for 30 minutes to obtain a uniform dispersion.

Into another 125 ml polypropylene bottle were placed 0.16 g of the polymer-coated carbon black prepared in Example 5 above, 0.16 g of the 10 per cent by weight solution of Emphos D-70-30C, and 47.80 g of 1:1 Isopar/Halocarbon mixture. The resultant mixture was sonicated for 30 minutes to obtain a uniform dispersion.

Following the separate sonication of these two dispersions, they were mixed and allowed to stand, with gentle agitation, for 24 hours before being encapsulated as described in Part B below.

Part B: Encapsulation

A 4 L reactor fitted with a water jacket, an overhead stirrer, a 1 L dropping funnel and a pH meter, was heated to 40° C. and charged with cold deionized water (2622.4 g). Over a period of approximately 30 seconds, gelatin (33.3 g) was added to the cold water, without stirring, and the resultant mixture was left to stand without stirring for 1 hour to allow the gelatin to swell. After this period, the mixture was agitated gently (at 50 rpm) to 30 minutes to dissolve the gelatin without producing foam, thus producing gelatin solution at 40° C. Separately, acacia (33.3 g, available from Sigma-Aldrich, Inc., P.O. Box 2060, Milwaukee Wis. 53201) was dissolved in cold deionized water (655.6 g) with rapid stirring, and the resultant solution heated to 40° C. over a period of 1 hour. Internal phase prepared as in Part A above (approximately 1 L) was heated to 40° C. and sonicated for 10 minutes.

The warm gelatin solution was stirred at 130 rpm, and the internal phase was added via the dropping funnel over a period of approximately 15 minutes; the addition was conducted by placing the outlet of the dropping funnel below the surface of the gelatin solution. After the addition of the internal phase was complete, the rate of stirring was increased to 175 rpm and the stirring continued for 30 minutes at 40° C. in order to emulsify the internal phase into droplets having an average diameter of about 300 μm.

The acacia solution was then added over a period of about 1 minute, care being taken to avoid foaming. The pH of the mixture was lowered to approximately 4.7 using 10 per cent aqueous acetic acid (approximately 3-4 g), and the vigorous stirring was continued to a further 40 minutes at the same temperature. The temperature of the mixture was lowered to 10° C. over a period of at least two hours, with continued vigorous stirring, and glutaraldehyde (16.7 g) was added. After this addition, the mixture was warmed to 25° C. over a period of 30 minutes and stirred vigorously for a further 12 hours. Finally, stirring was discontinued, and the mixture was discharged from the reactor and the capsules which had formed were isolated and washed three times by sedimentation and redispersion in deionized water until the pH of the wash water was 5.0.

Part C: Production of Electrophoretic Display

The capsules prepared in Part B above were mixed with an aqueous urethane binder (NeoRez R-9320, available from NeoResins, 730 Main Street, Wilmington Mass. 01887) at a ratio of 1 part by weight binder to 9 parts by weight of capsules, and 0.3 weight per cent of hydroxypropylmethylcellulose was added as a slot-coating additive. The resultant mixture was slot coated on to a 125 μm thick indium-tin oxide coated polyester film moving at 1 m/sec relative to the slot coating head. The coated film was allowed to air dry for 10 minutes, then oven dried at 50° C. for 15 minutes to produce an electrophoretic medium approximately 50 μm thick containing essentially a single layer of capsules (see the aforementioned published International Patent Application WO 00/20922).

The capsule-coated surface of the coated film was then overcoated with the aforementioned NeoRez R-9320 binder using a doctor blade with a 13 mil (330 μm) gap setting (this binder serves both to planarize the capsule-coated surface and as a lamination adhesive) and the overcoated film dried at 50° C. for 20 minutes. The dried film was then hot laminated to a backplane comprising a 3 mm thick sheet of polyester screen printed with thick film silver and dielectric inks with a pressure of 15 psig. The conductive areas of the backplane form addressable areas of the resulting display.

EXAMPLES 8-12

These Examples illustrates variations in the construction of encapsulated dual-particle electrophoretic displays similar to that produced in Example 7 above. In all these Examples, the lamination adhesive used was an 80 μm layer of the aforementioned NeoRez R-9320. The binder used was either the same material or Airflex (Registered Trade Mark) 430, a vinyl chloride/vinyl acetate/ethylene terpolymer adhesive sold by Air Products and Chemicals, Inc., Allentown, Pa. The charge control agent used was the aforementioned Emphos D-70-30C, Solsperse 17000 (available commercially from Avecia Ltd.) or Span 85 sold by ICI Americas, Inc., Wilmington, Del.; "Span" is a Registered Trade Mark). In Examples 8, 10, 11 and 12, the capsules were fractionated by size to a range of 200-400 μm; in Example 9, no such fractionation was effected.

Full details of the materials used in the electrophoretic displays are given in Table 1 below; in this Table, "EHA" denotes 2-ethylhexyl acrylate and "EHMA" denotes 2-ethylhexyl methacrylate; all the black pigments used 2-ethylhexyl acrylate as the monomer. The row denoted "Conductivity" indicates the conductivity of the electrophoretic medium as prepared with the binder, while "CCA" indicates the charge control agent used. "Weight % White (Black) Pigment" denotes the weight percentage relative to the weight of the internal phase, while "Weight % Polymer on White (Black) Pigment" denotes weight percentage relative to the starting weight of the relevant pigment.

TABLE 1

|  | Example No. | | | | |
| --- | --- | --- | --- | --- | --- |
|  | 8 | 9 | 10 | 11 | 12 |
| Binder | Airflex | NeoRez | NeoRez | Airflex | NeoRez |
| Conductivity pS/cm | 3.2 | 94.8 | — | — | 3.2 |
| Weight % Halocarbon | 46.9 | 45.9 | 47.8 | 47.8 | 46.9 |
| Weight % Isopar G | 46.9 | 45.9 | 47.8 | 47.8 | 46.9 |
| CCA | Span 85 | Solsperse | Emphos | Emphos | Span 85 |
| Weight % CCA | 2.00 | 0.40 | 0.04 | 0.04 | 2.00 |
| Weight % White Pigment | 3.99 | 3.99 | 3.83 | 3.83 | 3.99 |
| White Pigment Monomer | EHA | EHA | EHMA | EHMA | EHA |
| Weight % Polymer on White Pigment | 6 | 6 | 10 | 10 | 6 |
| Weight % Black Pigment | 0.16 | 0.16 | 0.15 | 0.15 | 0.15 |
| Weight % Polymer on Black Pigment | 15 | 15 | 15 | 15 | 15 |

EXAMPLE 13

This Example illustrates an ionic RGP process of the present invention in which titania is first treated with a silylating agent which places substituted ammonium groups on the surface of the titania to allow for the formation of the desired ionic bond with a polymerizable monomer.

A 2 per cent by weight solution of N-trimethoxysilyl-N,N,N-trimethylammonium chloride in ethanol/water/methanol was prepared by first preparing a 50 weight per cent solution of the silyl compound in methanol, and then adding this solution (22.3 g) to a 95:5 v/v ethanol/water mixture (547 g). The pH of the resultant solution was lowered from 8 to 5.5 by addition of 10 per cent aqueous acetic acid, and then titania (25.0 g of du Pont R960) was added, with vigorous stirring. The resultant mixture was centrifuged, the supernatant liquor decanted and the solids washed with ethanol (approximately 500 ml) and allowed to stand at room temperature for 24 hours to allow completion of the reaction. Thermogravimetric analysis indicated that 0.56 g of the silyl compound had become attached to each 100 g of titania.

To effect salt formation between the substituted ammonium groups on this product and an acid containing a polymerizable group, the product (21.5 g) was dispersed in water (265 ml) and 4-styrenesulfonic acid chloride dihydrate (0.2 g, 0.9 mmole) was added, and the resultant mixture was stirred for 1 hour, then 1 L of acetone was added and the mixture was centrifuged, the supernatant liquor decanted and the solids dried in air. The dried solids were dispersed in water (50 ml) and 4-styrenesulfonic acid (0.2 g, 0.9 mmole) was added. Isopropanol (250 ml) was added, the mixture was divided into two portions, and each portion was diluted to 250 ml with isopropanol and centrifuged, and the resultant solids re-dispersed in water (250 ml) and allowed to stand overnight, with gentle agitation. Finally, each portion was centrifuged, the resultant solids re-dispersed in acetone (250 ml) and again centrifuged, the mother liquor decanted and the solids allowed to dry overnight, then oven dried under vacuum for 2 hours at 70° C.

To effect the formation of polymer on the vinyl groups thus introduced into this product, the product (15 g), toluene (15 ml), 2-ethylhexyl acrylate (15 ml) and AIBN (150 mg in 10 ml of toluene) were placed in a 100 ml round-bottomed flask, which was purged with nitrogen for 30 minutes and heated to 66° C. for approximately 20 hours. The reaction mixture was then allowed to cool, centrifuged and the separated solids washed twice with THF, air dried and then dried under vacuum for 2 hours at 70° C. to yield a product which showed a weight loss of approximately 4 per cent on thermogravimetric analysis.

EXAMPLE 14

This Example illustrates an RGP-ATRP process of the present invention applied to carbon black.

Carbon black (19.4 g, bearing styrene groups, prepared as in Example 5, Part A above), toluene (150 ml), 2-ethylhexyl methacrylate (150 ml), p-chloromethylstyrene (2.2 mL), and AIBN (0.6 g) were placed in a round-bottomed flask, which was purged with nitrogen for 30 minutes, and then heated to 70° C. for 16 hours. The reaction mixture was then allowed to cool, and centrifuged. The supernatant liquor was decanted, and the solids redispersed in THF and again centrifuged; this process was repeated twice. The yield of product was 13.4 g, and thermogravimetric analysis indicated a polymer content of 10.0 per cent by weight.

To carry out the ATRP step of the process, this product (10 g) was mixed in a flask with 2-ethylhexyl methacrylate (220 ml), cuprous chloride (80 mg) and hexamethyltriethylenetetramine (156 mg). The flask was purged with nitrogen for 30 minutes, and then heated to 120° C. for 1.5 hours. The reaction mixture was then allowed to cool, and centrifuged. The supernatant liquor was decanted, and the solids redispersed in THF and again centrifuged; this process was repeated once more. Thermogravimetric analysis indicated a polymer content of 24 per cent by weight.

EXAMPLE 15

This Example illustrates the reaction of titania pigment with a silylating agent in the first step of an RGP process of the present invention.

To a 4 L Erlenmeyer flask equipped with a magnetic stir bar were added ethanol (2.5 L) and water (200 ml), and the pH of the solution was adjusted to 4.5 by addition of 33 per cent aqueous acetic acid. 3-(Trimethoxysilyl)propyl methacrylate (Dow Z6030, 124 ml, 130 g, 0.52 mole) was added, and the resultant mixture was stirred for 4 minutes to allow hydrolysis and condensation of the silyl compound to occur. After this stirring, silica-coated titania (300 g of du Pont R960) was added, and the reaction mixture was stirred for a further 7 minutes to allow the silyl compound to hydrogen bond to the titania. The reaction mixture was then poured into four 1 L centrifuge bottles and centrifuged for 15 minutes at 3500 rpm. The supernatant liquor was decanted and the solid pigment allowed to dry in air for 8 hours. The dried pigments from the four bottles were then combined into a single bottle, which was heated in an oven under vacuum to 70° C. for 2 hours to allow the silyl compound to react with and bond to the titania. The bottle was then removed from the oven and the pigment washed with ethanol to remove any non-bonded silyl compound by filling the bottle with ethanol, centrifuging for 15 minutes at 3000 rpm, decanting the liquid, and finally drying the pigment in air for 8 hours and then under vacuum at 70° C. for 2 hours. The silanized pigment thus produced showed a weight loss of 1.88 per cent under thermogravimetric analysis.

EXAMPLE 16

This Example illustrates the reaction of the silanized titania pigment produced in Example 15 with 2-ethylhexyl acrylate in the second step of an RGP process of the present invention.

To a 250 ml flask equipped with a condenser, a nitrogen blanket, a stir bar, and stirring beads was added the silanized pigment produced in Example 15 (50 g). A solution of 2-ethylhexyl acrylate (50 g, 0.27 mole) in toluene (53 ml, 50 g, 0.49 mole) was added to the flask in a disposable container, and the resultant mixture was stirred for 20 minutes while nitrogen was bubbled therethrough. The needles used to introduce the nitrogen were then removed, and the mixture was slowly heated to 60-65° C., with AIBN (0.5 g, 3 mmole, equal to 1 mole per cent of the monomer in the reaction mixture) dissolved in toluene (10 ml) being added when the temperature reached 50° C. The resultant reaction mixture was maintained at 60-65° C. under nitrogen for 18 hours, then allowed to cool to room temperature. Acetone (50 ml) was added to lessen the viscosity of the reaction mixture, which was poured into two 250 ml centrifuge bottles, with additional acetone being added to fill the bottles. The bottles were then centrifuged at 3000 rpm for 15 minutes and the supernatant liquor was decanted. The bottles were filled with THF and shaken vigorously until no pigment remained on the bottom of the bottles, then centrifuged at 3000 rpm for 15 minutes and the supernatant liquor was decanted. The polymer-coated pigment thus produced was allowed to air dry in the bottles for 4 hours until the pigment could readily be broken up. The two lots of pigment from the bottles were combined and dried under vacuum at 65° C. for 18 hours. The polymer-coated pigment thus produced showed a weight loss of 5.7 per cent under thermogravimetric analysis.

EXAMPLE 17

This Example illustrates the reaction of the silanized titania pigment produced in Example 15 with 2-ethylhexyl methacrylate in the second step of an RGP process of the present invention.

To a 250 ml flask equipped with a condenser, a nitrogen blanket, a stir bar, and stirring beads was added the silanized pigment produced in Example 15 (50 g). A solution of 2-ethylhexyl methacrylate (50 g, 0.25 mole) in toluene (53 ml, 50 g, 0.49 mole) was added to the flask in a disposable container, and the resultant mixture was stirred for 20 minutes while nitrogen was bubbled therethrough. The needles used to introduce the nitrogen were then removed, and the mixture was slowly heated to 60-65° C., with AIBN (0.5 g, 3 mmole, equal to 1 mole per cent of the monomer in the reaction mixture) dissolved in toluene (10 ml) being added when the temperature reached 50° C. The resultant reaction mixture was maintained at 60-65° C. under nitrogen for 18 hours, then allowed to cool to room temperature. Acetone (50 ml) was added to lessen the viscosity of the reaction mixture, which was poured into two 250 ml centrifuge bottles, with additional acetone being added to fill the bottles. The bottles were then centrifuged at 3000 rpm for 15 minutes and the supernatant liquor was decanted. The bottles were filled with THF and shaken vigorously until no pigment remained on the bottom of the bottles, then centrifuged at 3000 rpm for 20 minutes and the supernatant liquor was decanted. The polymer-coated pigment thus produced was allowed to air dry in the bottles for 4 hours until the pigment could readily be broken up. The two lots of pigment from the bottles were combined and dried under vacuum at 65° C. for 18 hours. The

EXAMPLE 18

This Example illustrates an RGP process of the present invention which produces a polymer-coated titania pigment particle in which the polymer coating contains cationic groups. The process uses an amino-containing silylating agent in the first step.

To a 1 L Erlenmeyer flask equipped with a magnetic stir bar were added ethanol (500 ml) and water (50 ml), and the pH of the solution was raised to 9.9 by dropwise addition of 33 per cent ammonium hydroxide. N-[3-(trimethoxysilyl)propyl]-N'-(4-vinylbenzyl)ethylene-diamine hydrochloride (40 g of a 40 weight per cent solution in methanol, equivalent to 16.125 g, 43 mmole of the pure compound) was added, and the resultant mixture was stirred for 4 minutes to allow hydrolysis and condensation of the silyl compound to occur. After this stirring, silica-coated titania (25 g of du Pont R960) was added, and the reaction mixture was stirred for a further 7 minutes to allow the silyl compound to hydrogen bond to the titania. The reaction mixture was then poured into centrifuge bottles and centrifuged for 15 minutes at 3000 rpm. The supernatant liquor was decanted and the solid pigment allowed to dry in air for 8 hours. The pigment was then heated in an oven under vacuum to 70° C. for 2 hours to allow the silyl compound to bond to the titania. The silanized pigment thus produced showed a weight loss of 2.47 per cent under thermogravimetric analysis.

The silanized pigment thus produced was then polymerized with 2-ethylhexyl acrylate in exactly the same manner as in Example 17 above, but on a smaller scale; the reaction mixture comprised 15 g of the silanized pigment, 15 g of the monomer, 15 g of toluene and 0. 15 g of AIBN. The final polymer-coated titania showed a polymer content of 6.7 per cent by weight by thermogravimetric analysis.

EXAMPLE 19

This Example illustrates an RGP process of the present invention using t-butyl acrylate.

To a round-bottomed flask equipped with a condenser, a nitrogen blanket, a stir bar, and stirring beads was added the silanized pigment produced in Example 15 (25 g). A solution of t-butyl acrylate (20 g) in toluene (25 g) was added to the flask in a disposable container, and the resultant mixture was stirred for 20 minutes while nitrogen was bubbled therethrough. The needles used to introduce the nitrogen were then removed, and the mixture was slowly heated to 58° C., with AIBN (0.25 g) dissolved in toluene (5 ml) being added when the temperature reached 50° C. The resultant reaction mixture was maintained at 58° C. under nitrogen for 2 hours, then allowed to cool to room temperature, whereupon the reaction mixture solidified. Acetone was added to liquefy the reaction mixture, which was then was poured into a centrifuge bottle, with additional acetone being added to fill the bottle. The bottle was then centrifuged at 3000 rpm for 15 minutes and the supernatant liquor was decanted. The bottle was filled with THF and shaken vigorously until no pigment remained on the bottom of the bottle, then centrifuged at 3000 rpm for 20 minutes and the supernatant liquor was decanted. The polymer-coated pigment thus produced was allowed to air dry in the bottle until the pigment could readily be broken up, and then dried under vacuum at 60° C. for 18 hours. The polymer-coated pigment thus produced showed a weight loss of 6 per cent by weight under thermogravimetric analysis.

EXAMPLE 20

This Example illustrates an RGP process of the present invention in which the monomers used includes a fluorinated acrylate, namely 2,2,3,4,4,4-hexafluorobutyl acrylate.

To a round-bottomed flask equipped with a condenser, a nitrogen blanket, a stir bar, and stirring beads was added the silanized pigment produced in Example 15 (15 g). A solution of 2-ethylhexyl acrylate (13.5 g) and 2,2,3,4,4,4-hexafluorobutyl acrylate (1.92 g) in toluene (15 g) was added to the flask in a disposable container, and the resultant mixture was stirred for 20 minutes while nitrogen was bubbled therethrough. The needles used to introduce the nitrogen were then removed, and the mixture was slowly heated to 60-65° C., with AIBN (0.15 g) dissolved in toluene (approximately 5 ml) being added when the temperature reached 50° C. The resultant reaction mixture was maintained at 60-65° C. under nitrogen for 18 hours, then allowed to cool to room temperature. Acetone was added, and the reaction mixture was poured into a centrifuge bottle, with additional acetone being added to fill the bottle. The bottle was then centrifuged at 3000 rpm for 15 minutes and the supernatant liquor was decanted. The bottle was filled with THF and shaken vigorously until no pigment remained on the bottom of the bottle, then centrifuged at 3000 rpm for 20 minutes and the supernatant liquor was decanted. The polymer-coated pigment thus produced was allowed to air dry in the bottle until the pigment could readily be broken up, and then dried under vacuum at 50° C. for 18 hours.

EXAMPLE 21

This Example illustrates an RGP process of the present invention in which the monomer used is isobutyl methacrylate.

To a round-bottomed flask equipped with a condenser, a nitrogen blanket, a stir bar, and stirring beads was added the silanized pigment produced in Example 15 (15 g). A solution of isobutyl methacrylate (15 g) in isopropanol (15 g) was added to the flask in a disposable container, and the resultant mixture was stirred for 15 minutes while nitrogen was bubbled therethrough. The needles used to introduce the nitrogen were then removed, and the mixture was slowly heated to 60-65° C., with AIBN (0.15 g) dissolved in toluene (approximately 5 ml) being added when the temperature reached 50° C. The resultant reaction mixture was maintained at 60-65° C. under nitrogen for 18 hours, then allowed to cool to room temperature. Acetone was added, and the reaction mixture was poured into a centrifuge bottle, with additional acetone being added to fill the bottle. The bottle was then centrifuged at 3000 rpm for 15 minutes and the supernatant liquor was decanted. The bottle was refilled with acetone and shaken vigorously until no pigment remained on the bottom of the bottle, then centrifuged at 3000 rpm for 20 minutes and the supernatant liquor was decanted. The polymer-coated pigment thus produced was allowed to air dry in the bottle until the pigment could readily be broken up, and then dried under vacuum at 50° C. for 18 hours. The polymer-coated pigment thus produced showed a weight loss of 4.5 per cent under thermogravimetric analysis.

EXAMPLE 22

This Example illustrates an RGP process of the present invention in which the monomer used is lauryl methacrylate.

To a round-bottomed flask equipped with a condenser, a nitrogen blanket, a stir bar, and stirring beads was added silanized pigment produced as in Example 15 (50 g). A solution of lauryl methacrylate (70 g, 0.272 mole) in toluene (60 g) was added to the flask in a disposable container, and the resultant mixture was stirred for 20 minutes while nitrogen was bubbled therethrough. The needles used to introduce the nitrogen were then removed, and the mixture was slowly heated to 60-65° C., with AIBN (0.5 g, 3 mmole, equal to 1 mole per cent of the monomer in the reaction mixture) dissolved in toluene (10 ml) being added when the temperature reached 50° C. The resultant reaction mixture was maintained at 60-65° C. under nitrogen for 16 hours, then allowed to cool to room temperature. Acetone (50 ml) was added to lessen the viscosity of the reaction mixture, which was poured into two 250 ml centrifuge bottles, with additional acetone being added to fill the bottles. The bottles were then centrifuged at 3000 rpm for 15 minutes and the supernatant liquor was decanted. The bottles were filled with toluene (washing with THF being unsatisfactory for this polymer-coated pigment) and shaken vigorously until no pigment remained on the bottom of the bottles, then centrifuged at 3000 rpm for 15 minutes and the supernatant liquor was decanted. The toluene dispersion and centrifuging was repeated, then the polymer-coated pigment produced was allowed to air dry in the bottles for 4 hours until the pigment could readily be broken up. The two lots of pigment from the bottles were combined and dried under vacuum at 70° C. overnight. The polymer-coated pigment thus produced showed a weight loss of 10.3 per cent under thermogravimetric analysis.

EXAMPLE 23

This Example illustrates an RGP process of the present invention in which the monomer used is isobornyl methacrylate.

The process was conducted using a silanized titania prepared as in Example 15, and a polymerization process as described in Example 16 above, except that the reaction mixture was maintained at 60-65° C. for only 16 hours, that the acetone/THF washing procedure used in Example 16 was replaced by two THF washes, and that the drying under vacuum was conducted at 70° C. The reaction mixture used comprised the silanized pigment (50 g), isobornyl methacrylate (60 g, 0.27 mole) toluene (60 g) and AIBN (0.5 g dissolved in 10 ml of toluene). The polymer-coated pigment thus produced showed a weight loss of 6.4 per cent under thermogravimetric analysis.

EXAMPLE 24

This Example illustrates an RGP process of the present invention in which the monomer used is t-butyl methacrylate.

The process was conducted using a silanized titania prepared as in Example 15, and a polymerization process as described in Example 16 above, except that the reaction mixture was maintained at 60-65° C. for only 16 hours, and that the drying under vacuum was conducted at 70° C. The reaction mixture used comprised the silanized pigment (50 g), t-butyl methacrylate (40 g, 0.27 mole). toluene (60 g) and AIBN (0.5 g dissolved in 10 ml of toluene). The polymer-coated pigment thus produced showed a weight loss of 5.8 per cent under thermogravimetric analysis.

EXAMPLE 25

This Example illustrates an RGP process of the present invention starting from molybdate orange, a coprecipitate of lead chromate, lead molybdate and lead sulfate. The commercial starting material used is silica encapsulated by the manufacturer.

To a mixture of ethanol (1000 ml) and water (150 ml), concentrated ammonium hydroxide was added until the pH reached 9.95. N-[3-(trimethoxysilyl)propyl-N'-(4-vinyl-benzyl)ethylene diamine hydrochloride (121 g) was added, and the resultant solution was stirred rapidly for 4 minutes. Molybdate orange (75 g, KROLOR KO-906-D, sold by Dominion Colour Corporation) was then added, and the mixture stirred rapidly for 7 minutes. The resultant suspension was poured into plastic bottles and centrifuged at 3000 rpm for 30 minutes. The supernatant liquor was decanted, and the silanized pigment re-dispersed in ethanol and centrifuged at 3500 rpm for 30 minutes, and the liquid decanted. The pigment was dried in air for 18 hours, then under vacuum at 70° C. for 1 hour.

The silanized pigment thus produced was then polymerized with 2-ethylmethacrylate using a polymerization process as described in Example 17 above, except that the reaction mixture was maintained at 68° C. for 18 hours, and that the drying under vacuum was conducted at 70° C. for 12 hours. The reaction mixture used comprised the silanized pigment (50 g), 2-ethylhexyl methacrylate (50 g). toluene (60 g) and AIBN (0.5 g dissolved in 10 ml of toluene).

EXAMPLE 26

This Example illustrates an RGP process of the present invention starting from chrome yellow. The commercial starting material used is lead chromate, which is silica encapsulated by the manufacturer.

To a mixture of ethanol (1000 ml) and water (150 mL), acetic acid was added until the pH reached 9.95. 3-(Trimethoxysilyl)propyl methacrylate (35 ml) was added, and the resultant solution was stirred rapidly for 4 minutes. Chrome yellow (75 g, KROLOR KY-788-D, sold by Dominion Colour Corporation) was then added, and the mixture stirred rapidly for 7 minutes. The resultant suspension was poured into plastic bottles and centrifuged at 3000 rpm for 30 minutes. The supernatant liquor was decanted, and the resultant pigment was dried in air, then under vacuum at 70° C. for 2 hours. The pigment was then redispersed in ethanol, centrifuged in the same manner as before, and dried in air, then under vacuum at 70° C. for 1 hour.

To form polymer on the silanized pigment thus produced, to a round-bottomed flask equipped with a condenser, a nitrogen blanket, a stir bar, and stirring beads was added the silanized pigment (50 g). A solution of 2-ethylhexyl methacrylate (56 ml) in toluene (58 ml) was added to the flask in a disposable container, and the resultant mixture was stirred for 25 minutes while nitrogen was bubbled therethrough. The needles used to introduce the nitrogen were then removed, and the mixture was slowly heated to 60° C., with AIBN (0.5 g in 10 ml of toluene) being added when the temperature reached 50° C. The resultant reaction mixture was maintained at 60° C. under nitrogen for 17 hours, then allowed to cool to room temperature. The reaction mixture was poured into two 250 ml centrifuge bottles, with additional acetone being added to fill the bottles. The bottles were then centrifuged at 3000 rpm for 15 minutes and the supernatant liquor was decanted. The bottles were filled with toluene and shaken vigorously until no pigment remained on the bottom of the bottles, then centrifuged at 3000 rpm for 15 minutes and the supernatant liquor was decanted, then the polymer-coated pigment produced was allowed to dry under vacuum overnight. The polymer-coated pigment thus produced showed a weight loss of 10.83 per cent under thermogravimetric analysis.

EXAMPLE 27

This Example illustrates an RGP process of the present invention which produces carbon black carrying a polymer of 2-ethylhexyl methacrylate.

Carbon black (115 g) was dispersed in water (3 L) with magnetic stirring, then hydrochloric acid (3 mL of 37% by weight) and 4-vinylaniline (2.5 g,) were added. Separately, sodium nitrite (1.43 g) was dissolved in water (10 ml). This nitrite solution was then added slowly to the carbon black-containing reaction mixture, and the resultant reaction mixture was heated to 65° C. and stirred for 3 hours. The reaction mixture was then allowed to cool and stirred overnight at room temperature. The resultant product was centrifuged and the solids produced rinsed with water and dried overnight.

To a reaction flask fitted with a nitrogen purge apparatus, magnetic stir bar and reflux column were added this product (50 g), toluene (100 ml), 2-ethylhexyl methacrylate (100 ml) and AIBN (0.65 g). The flask was purged with nitrogen for 20 minutes, with stirring, then immersed in an oil bath, gradually heated to 70° C., with continuous stirring, and maintained at this temperature for 7 hours. The reaction mixture was then allowed to cool, diluted to a volume of 500 ml with THF, and poured into methanol (3 L). The solids which precipitated were collected, re-dispersed in THF (1.5-2 L), cooled to 10° C. and centrifuged for 1 hour at 3500 rpm. The liquid was decanted, and the THF washing step repeated, and the product was dried under vacuum at 70° C. to yield 53 g of a polymer-coated carbon black which showed a weight loss of 12.3 per cent on thermogravimetric analysis.

The pigments produced in Examples 26 and 27 were encapsulated together substantially as described in Example 7 above to produce a yellow/black encapsulated dual particle electrophoretic display.

EXAMPLE 28

This Example illustrates an RGP process of the present invention which produces titania pigment coated with a lauryl methacrylate polymer.

Part A: Preparation of Silanized Titania

To a 4 L glass reactor equipped with a stirrer and a pH meter were added ethanol (930.7 g) and deionized water (69.3 g), and the resultant solution was stirred at 150 rpm. The probe of the pH meter was inserted into the reactor and the pH of the mixture was lowered to 4.5 by adding glacial acetic acid from a pipette. The pH probe was then removed, 3-(trimethoxysilyl)propyl methacrylate (160. 0 g) was added to the reactor, and the reaction mixture was stirred for a further 5 minutes. The mixing speed was then increased to 250 rpm, titania (1000 g of du Pont R960) was added to the reactor, and the reaction mixture was stirred for a further 10 minutes. The mixing speed was then decreased to 200 rpm, ethanol (1826.6 g) was added to the reactor, and stirring was continued for 1 minute. The reaction mixture was then drained into six 750 ml centrifuge bottles and centrifuged at 3000 rpm for 20 minutes. The supernatant liquor was discarded and the solids dried in air overnight and then under vacuum for 4 hours at 70° C.

Part B: Preparation of Polymer-coated Pigment

To a 4 L glass reactor equipped with a water bath, a nitrogen source, a condenser, a stirrer and a septum was added lauryl methacrylate (960 g) and toluene (1386 g). The mixture was stirred at 200 rpm and the water bath was set to 50° C. to preheat the reactor. The silanized titania (750 g, prepared in Part A above) was weighed out and any large chunks crushed manually. The mixer speed was then increased to 300 rpm and the silanized titania was added to the reactor, which was then purged with nitrogen. Separately AIBN (5.64 g) was dissolved in toluene (150 g) and the resultant solution loaded into a syringe pump, the output needle of which was pushed through the septum into the reactor. Once the reactor temperature had stabilized at 50° C., the AIBN solution was pumped into the reaction mixture at a uniform rate over a period of 1 hour. The reaction mixture was then held at 70° C. with stirring overnight, then drained into six 750 ml centrifuge bottles, which were filled with toluene and shaken until a substantially uniform dispersion was obtained. The bottles were then centrifuged at 3000 rpm for 30 minutes, the supernatant liquor was discarded, and the toluene dispersion, centrifugation and decantation steps repeated. Finally, the bottles were allowed to dry in air overnight, and then in vacuum at 70° C. for 4 hours.

EXAMPLE 29

This Example illustrates the construction of an encapsulated dual particle display using the polymer-coated pigments prepared in Examples 27 and 28.

Part A: Preparation of Internal Phase

To make 1000 g of internal phase ready for encapsulation, 120 g of titania and 9 g of carbon black were separately polymer coated substantially as described in Examples 28 and 27 respectively. (To be more accurate, batches of the two polymer-coated pigments were prepared and the proportion of pure pigment present in the polymer-coated pigment was determined by thermogravimetric analysis. The weights of the polymer-coated pigment containing the required 120 or 9 g of pure pigment were determined, and these weights were used in the following procedures.) The polymer-coated titania was mixed with 3.0 per cent of its own weight of Solsperse 17000 dispersant (added in the form of a 10 w/w % solution in Isopar G) and made up into a 30 per cent w/w stock solution in a 1:1 w/w Isopar/Halocarbon mixture. The polymer-coated carbon black was similarly made up into an approximately 5 per cent w/w stock solution using a microfluidizer. The two resultant stock solutions were combined with sufficient additional 1:1 w/w Isopar/Halocarbon mixture to make 1000 g of the mixture, which was well shaken and stored on a roll mill for at least 24 hours before being used in the encapsulation process. (If the final electrophoretic medium is to contain polyisobutylene, this polymer is added at this mixing stage. It is presently preferred that there be added 1.4-1.5 per cent by weight of the Isopar/Halocarbon mixture of the polyisobutylene Aldrich catalogue number 18145-5, weight average molecular weight approximately 500,000, number average molecular weight approximately 200,000, $T_g$ −76° C., $T_m$ 1.5° C., stabilized with 500 ppm 2,6-di-t-butyl-4-methylphenol.)

Part B: Encapsulation

The internal phase thus prepared was then encapsulated using a 4 L reactor equipped with a water jacket, an overhead stirrer, a 1 L dropping funnel and a pH meter. Gelatin (22.5 g) was dissolved in deionized water (1311.2 g) at 40° C. with stirring, care being taken to ensure that no foam was produced on the surface of the solution. Separately, acacia (16.7 g) was dissolved in deionized water (327.8 g) and the resultant solution heated to 40° C. Also separately, the internal phase described above (580 g) was heated to 40° C. and then added, over a period of approximately 15 minutes to the gelatin solution; the gelatin solution was stirred during the addition, which was conducted by introducing the internal phase through the dropping funnel, the outlet of which was placed below the surface of the gelatin solution. After the addition of the internal phase was complete, the rate of stirring was increased and the stirring continued for 30 minutes at 40° C.

in order to emulsify the internal phase into droplets having an average diameter of about 80 μm.

The acacia solution was then added over a period of about 1 minute, care being taken to avoid foaming. The pH of the mixture was lowered to approximately 4.9 using 10 per cent aqueous acetic acid, and the vigorous stirring was continued to a further 40 minutes at the same temperature. The temperature of the mixture was lowered to 10° C. over a period of two hours, with continued vigorous stirring, and glutaraldehyde (8.35 g) was added. After this addition, the mixture was gradually warmed to 25° C. and stirred vigorously for a further 12 hours. Finally, stirring was discontinued, and the mixture was allowed to settle for 10-15 minutes, during which time approximately 25-50 mm of a foamy mixture separated on top of the liquid.

The liquid phase was then removed, leaving the foamy mixture in the reactor, and the capsules in this liquid phase washed three times by sedimentation and redispersion in deionized water. The capsules were separated by size to yield a distribution between 50 and 120 μm diameter, with a mean diameter of 70-80 μm; such a distribution can be effected by sieving the capsules for 90 seconds on a 63 μm sieve and then for 30 seconds on a 38 μm sieve to produce the final capsule slurry.

Part C: Production of Electrophoretic Display

The resulting capsule slurry was centrifuged and then mixed with an aqueous urethane binder (NeoRez R-9320) at a ratio of 1 part by weight binder to 9 parts by weight of capsules, and 0.3 weight per cent of hydroxypropylmethylcellulose was added as a slot-coating additive. The resultant mixture was slot coated on to a 125 μm thick indium-tin oxide coated polyester film moving at 1 m/sec relative to the slot coating head. The coated film was allowed to air dry for 10 minutes, then oven dried at 50° C. for 15 minutes to produce an electrophoretic medium approximately 50 μm thick containing essentially a single layer of capsules (see the aforementioned published International Patent Application WO 00/20922).

To provide an electrophoretic display which could be used to investigate the properties of the electrophoretic medium thus prepared, the capsule-coated surface of the coated film was then overcoated with the aforementioned NeoRez R-9320 binder using a doctor blade with a 13 mil (330 μm) gap setting (this binder serves both to planarize the capsule-coated surface and as a lamination adhesive) and the overcoated film dried at 50° C. for 20 minutes. The dried film was then hot laminated to a backplane comprising a 3 mm thick sheet of polyester screen printed with thick film silver and dielectric inks with a pressure of 15 psig. (The backplane was prepared by printing on the polyester sheet a first layer of silver ink which defined leads connecting to external control circuitry. A layer of dielectric ink was then printed over the first layer of silver ink, this layer of dielectric ink being continuous except for small apertures which would eventually form vias. A second layer of silver ink was then printed over the dielectric ink; this second layer of silver ink formed the electrodes, and also flowed into the apertures in the layer of dielectric ink, thus forming vias which connected the electrodes to the leads. See U.S. Pat. No. 6,232,950, issued May 15, 2001 (the entire disclosure of which is herein incorporated by reference), and the aforementioned published International Applications WO 99/10768 and WO 00/20922.)

The electrophoretic displays thus prepared exhibited outstanding properties. In particular, the titania and carbon black pigment particles do not form strong aggregates even after prolonged standing, and the operating life of the display is markedly superior to that of single particle displays using titania pigments.

EXAMPLE 30

This Example illustrates the construction of an encapsulated dual particle display generally similar to that produced in Example 29 above and using the same polymer-coated pigments, but using a pure hydrocarbon suspending fluid.

Part A: Preparation of Internal Phase

To make 1064 g of internal phase ready for encapsulation, 678 grams of a first precursor was prepared by combining 406.8 g of polymer-coated titania prepared substantially as described in Example 28 above with 271.2 g of Isopar solvent. This dispersion was mixed overnight and then sonicated for approximately 1 to 2 hours. In a separate jar, 16.7 grams of polymer-coated carbon black prepared substantially as in Example 27 above were combined with 67.0 grams of Isopar solvent; this dispersion was then high shear dispersed. The titania and carbon black dispersions were then combined and diluted with 194.9 g of Isopar solvent, 48.8 g of a 10 weight percent solution of charging agent (Solsperse 17000) in Isopar solvent, 5.2 g of surfactant (Span85), and the necessary quantity of polymer in Isopar solvent. The resultant internal phase was mixed overnight prior to encapsulation.

Part B: Encapsulation of Internal Phase, and Preparation of Displays

To encapsulate the internal phase thus prepared, in a 4 L reactor, gelatin (66.7 g) was dissolved in deionized water (2622.2 g) at 40° C. with stirring, care being taken to ensure that no foam was produced on the surface of the solution. Separately, acacia (66.7 g—available from Sigma-Aldrich) was dissolved in deionized water (655.6 g) and the resultant solution heated to 40° C. Also separately, the internal phase described above (1060 g) was heated to 40° C. and then added, over a period of approximately 15 minutes to the gelatin solution; the gelatin solution was stirred during the addition, which was conducted by introducing the internal phase through a dropping funnel the outlet of which was placed below the surface of the gelatin solution. After the addition of the internal phase was complete, the rate of stirring was increased and the stirring continued for 60 minutes at 40° C. in order to emulsify the internal phase into droplets having an average diameter of about 40 μm.

The acacia solution was then added over a period of about 1 minute, care being taken to avoid foaming. The pH of the mixture was lowered to approximately 4.9 using 10 per cent aqueous acetic acid, and the vigorous stirring was continued to a further 40 minutes at the same temperature. The temperature of the mixture was lowered to 10° C. over a period of two hours, with continued vigorous stirring, and 16.7 g of a 50 weight percent solution of glutaraldehyde was added. After this addition, the mixture was gradually warmed to 25° C. and stirred vigorously for a further 12 hours.

The liquid phase was then removed and the capsules in this liquid phase washed one time by sedimentation and redispersion in deionized water. The capsules were separated by size to yield a distribution between 20 and 60 μm diameter, with a mean diameter of about 40 μm. Such a distribution can be effected by sieving the capsules for 90 seconds on a 38 μm sieve and then for 90 seconds on a 25 μm sieve to produce the final capsule slurry.

The resulting capsule slurry was adjusted to pH 8 with 1 weight percent ammonium hydroxide solution. Capsules were concentrated by centrifugation and then mixed with an aqueous urethane binder at a ratio of 1 part by weight binder to 8 parts by weight of capsules. The resultant mixture was bar coated on to a 125 μm thick indium-tin oxide coated polyester film so that after the coated film was allowed to air dry for 1 hour, an electrophoretic medium approximately 20 μm thick containing essentially a single layer of capsules was produced.

A polyurethane adhesive was coated on to a polyethylene terephthalate release sheet using a slot-die coater. The coated release sheet was transferred to an oven at 65° C. and dried for 10 minutes. During coating, the flow rate through the slot, and the coating-head speed, were adjusted to provide a film of adhesive that measured 15 μm thick when dry. The coated release sheet was then laminated to the microcapsule-coated polyester film using a Western Magnum roll laminator; the dried release sheet was laid on top of the microcapsule layer and laminated in the nip of the laminator at 50 PSI (0.46 mPa), with the upper roll at 300° F. (149° C.) and the lower roll at 275° F. (135° C.), at a linear speed of 0.7 ft/min (3.5 mm/sec). The resulting laminate was then cooled, and a single-pixel display produced by cutting a piece of appropriate size from the cooled laminate, removing the release sheet, and laying the film, adhesive side down, on a rear electrode and passing through the laminator using the same conditions as before.

EXAMPLE 31

This Example illustrates a preferred technique for silica-coating of a pigment particle.

Copper chromite (Shepherd Black 1G, 50 g) was treated with sodium silicate and sulfuric acid solutions in the same way as described in Example 1 above, up to the point at which the reaction mixture was cooled to room temperature. Additional sulfuric acid (18 mL of 1M acid) was then added to the reaction mixture to lower its pH from about 9.5-10 to about 3. The reaction mixture was then placed in plastic bottles and centrifuged at 3700 rpm for 15 minutes, and the supernatant liquid decanted. Immediately after this decantation, deionized water (5 mL) and ethanol (50 mL) were added to each bottle, which was then shaken vigorously. The bottles were then sonicated for 1 hour. Microscopic investigation of the resultant dispersion revealed well-dispersed primary pigment particles.

The dispersion of silica-coated pigment thus produced was used without any further treatment in a silanization process similar to that of FIG. 2. For this purpose, a mixture of 300 ml of ethanol, 30 ml of water and 40 g of a 40 weight percent solution of N-[3-(trimethoxysilyl)propyl]-N'-(4-vinylbenzyl)ethylene diamine hydrochloride in methanol was stirred rapidly for 7 minutes, the pigment dispersion was added thereto, and the resultant mixture was stirred for a further 5 minutes. Isolation of the product and its conversion to a polymer-coated pigment were effected in the same manner as described in Examples 2 and 3 above, with very satisfactory results.

Shepherd 444 pigment (a copper/manganese chromate) was polymer-coated in the same manner and also found to yield satisfactory results.

Numerous changes and modifications can be made in the preferred embodiments of the present invention already described without departing from the spirit of the invention. For example, the electrophoretic media and displays of the present invention may contain magnetic particles, as described in application Ser. No. 10/063,655 filed May 7, 2002 (Publication No. 2002/0171901; the entire disclosure of this application is herein incorporated by reference). Accordingly, the foregoing description is to be construed in an illustrative and not in a limitative sense.

The invention claimed is:

1. A process for coating a pigment particles with silica, the process comprising:
   dispersing the pigment particles in a solution of a soluble silicate at a pH above about 8 and a temperature above about 60° C.;
   adding to the dispersion of the pigment particles both a solution of an acid and a solution of a soluble silicate while maintaining the temperature of the dispersion above about 60° C., thereby causing deposition of silica on to the particles; and
   lowering the pH of the dispersion below about 4, and thereafter separating the silica-coated particles from the liquid.

2. A process according to claim 1 wherein the dispersion of the pigment particles is maintained at a temperature in the range of about 80 to about 100° C. as the solution of the acid and the solution of the soluble silicate are added thereto.

3. A process according to claim 1 wherein the soluble silicate is sodium silicate.

4. A process according to claim 1 wherein the acid is sulfuric acid.

5. A process according to claim 1 wherein the reaction mixture is maintained substantially free from aluminum.

6. A process according to claim 1 further comprising redispersing the separated silica-coated particles in an aqueous alcohol.

7. A process according to claim 1 wherein the pigment particles comprise copper chromite.

8. A process according to claim 1 wherein the silica-coated particles are treated with a silane coupling agent having a functional group capable of reacting with, and bonding to, the particles, and also having a polymerizable or polymerization initiating group, thereby causing the functional group to react with the particle surface and attach the polymerizable group thereto.

9. A process according to claim 8 wherein the silane coupling agent is a trialkoxysilane coupling agent.

10. A process according to claim 8 wherein, after treatment with the silane coupling agent, the particles are reacted with at least one monomer or oligomer under conditions effective to cause reaction between the particles and the at least one monomer or oligomer, thereby causing the formation of polymer bonded to the particle.

* * * * *